United States Patent
Ikeno

(10) Patent No.: US 7,580,168 B2
(45) Date of Patent: Aug. 25, 2009

(54) DENSITY-ADJUSTING DEVICE THAT CHANGES THE GAMMA CHARACTERISTICS OF REGIONS OF A COPIED IMAGE BASED ON A DIFFERENCE VALUE TO A SET OF MONOTONOUS GAMMA CORRECTION CURVES

(75) Inventor: Takahiro Ikeno, Owariasahi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 835 days.

(21) Appl. No.: 11/143,733

(22) Filed: Jun. 3, 2005

(65) Prior Publication Data

US 2005/0280866 A1    Dec. 22, 2005

(30) Foreign Application Priority Data

Jun. 4, 2004    (JP) .............................. 2004-167353

(51) Int. Cl.
*G03F 3/08*    (2006.01)
*H04N 1/40*    (2006.01)

(52) U.S. Cl. ..................... 358/519; 358/1.9; 358/461; 358/521; 382/274

(58) Field of Classification Search ............... 358/1.9, 358/2.1, 2.01, 3.01, 3.21, 3.23, 3.24, 461, 358/501, 518, 519, 520, 523, 3.1, 521; 382/132, 382/274, 167, 169; 345/154, 155, 431, 581, 345/589
See application file for complete search history.

(56) References Cited

U.S. PATENT DOCUMENTS

| | | | | |
|---|---|---|---|---|
| 4,667,228 A | * | 5/1987 | Kawamura et al. | 358/519 |
| 4,956,718 A | * | 9/1990 | Numakura et al. | 358/3.21 |
| 5,121,198 A | * | 6/1992 | Maronian | 358/527 |
| 5,300,381 A | * | 4/1994 | Buhr et al. | 430/30 |
| 5,317,427 A | * | 5/1994 | Ichikawa | 358/520 |
| 5,523,861 A | * | 6/1996 | Tanaka et al. | 358/475 |
| 5,541,028 A | * | 7/1996 | Lee et al. | 430/30 |
| 5,585,927 A | * | 12/1996 | Fukui et al. | 358/518 |

(Continued)

FOREIGN PATENT DOCUMENTS

JP    8-186728 A    7/1996

(Continued)

OTHER PUBLICATIONS

JP Office Action dtd Jan. 22, 2008, JP Appln. 2004-167353.

*Primary Examiner*—Benny Q Tieu
*Assistant Examiner*—Christopher W Mutz
(74) *Attorney, Agent, or Firm*—Banner & Witcoff, Ltd

(57) ABSTRACT

In a set of non-reference gamma characteristics corresponding to a density adjustment value, a first region has first characteristics for converting input values to the maximum output value. A second region has second characteristics for converting input values to the minimum output value. A third region defined between the first and second regions has third characteristics for converting input values to intermediate output values. The third characteristics defines a monotonous curve that changes monotonously with respect to change in the amount of the input value. The amount of at least one of the first region and the second region is different from the amount of the corresponding at least one of the first reference region and the second reference region of the reference gamma characteristics by a degree dependent on each density adjustment value.

24 Claims, 12 Drawing Sheets

U.S. PATENT DOCUMENTS

| | | | | |
|---|---|---|---|---|
| 5,589,954 A * | 12/1996 | Watanabe | | 358/518 |
| 5,715,377 A * | 2/1998 | Fukushima et al. | | 358/1.9 |
| 5,754,683 A * | 5/1998 | Hayashi et al. | | 382/167 |
| 5,784,488 A * | 7/1998 | Kuwata | | 382/176 |
| 5,889,928 A * | 3/1999 | Nakamura et al. | | 358/1.9 |
| 5,926,562 A * | 7/1999 | Hyodo et al. | | 382/167 |
| 5,929,417 A * | 7/1999 | Hayashi et al. | | 235/454 |
| 5,953,498 A * | 9/1999 | Samworth | | 358/1.9 |
| 5,966,503 A * | 10/1999 | van Vliembergen et al. | | 358/1.6 |
| 6,055,071 A * | 4/2000 | Kuwata et al. | | 358/501 |
| 6,064,494 A | 5/2000 | Hirota et al. | | |
| 6,115,150 A * | 9/2000 | Nakamura et al. | | 358/521 |
| 6,160,922 A * | 12/2000 | Hayashi | | 382/274 |
| 6,172,771 B1 * | 1/2001 | Ikeda et al. | | 358/406 |
| 6,198,841 B1 * | 3/2001 | Toyama et al. | | 382/164 |
| 6,222,640 B1 | 4/2001 | Peulen et al. | | |
| 6,285,798 B1 * | 9/2001 | Lee | | 382/260 |
| 6,370,265 B1 * | 4/2002 | Bell et al. | | 382/132 |
| 6,373,990 B1 * | 4/2002 | Ushida et al. | | 382/252 |
| 6,406,117 B2 * | 6/2002 | Kuno et al. | | 347/15 |
| 6,577,285 B1 * | 6/2003 | Motonakano et al. | | 345/10 |
| 6,616,262 B2 * | 9/2003 | Nakajima et al. | | 347/19 |
| 6,674,544 B2 | 1/2004 | Shiota et al. | | |
| 6,690,490 B1 * | 2/2004 | Murakami | | 358/1.9 |
| 6,753,987 B1 * | 6/2004 | Farnung et al. | | 358/518 |
| 6,788,431 B1 * | 9/2004 | Yamaguchi | | 358/1.9 |
| 6,868,183 B1 * | 3/2005 | Kodaira et al. | | 382/203 |
| 6,909,814 B1 * | 6/2005 | Nakajima | | 382/274 |
| 6,934,057 B1 * | 8/2005 | Namizuka | | 358/2.1 |
| 7,061,648 B2 * | 6/2006 | Nakajima et al. | | 358/1.9 |
| 7,099,042 B2 * | 8/2006 | Yaguchi | | 358/1.9 |
| 7,113,649 B2 * | 9/2006 | Gindele | | 382/274 |
| 7,158,686 B2 * | 1/2007 | Gindele | | 382/274 |
| 7,221,807 B2 * | 5/2007 | Campbell | | 382/274 |
| 7,233,414 B2 * | 6/2007 | Okada et al. | | 358/3.01 |
| 7,245,398 B2 * | 7/2007 | Namizuka | | 358/2.1 |
| 7,251,056 B2 * | 7/2007 | Matsushima | | 358/1.9 |
| 7,450,280 B2 * | 11/2008 | Hayashi | | 358/521 |
| 2001/0033387 A1 * | 10/2001 | Nogiwa et al. | | 358/1.9 |
| 2002/0021360 A1 * | 2/2002 | Takemoto | | 348/222 |
| 2003/0020703 A1 * | 1/2003 | Holub | | 345/207 |
| 2003/0020974 A1 * | 1/2003 | Matsushima | | 358/521 |
| 2003/0043410 A1 * | 3/2003 | Fukawa et al. | | 358/2.1 |
| 2003/0095272 A1 * | 5/2003 | Nomizu | | 358/1.9 |
| 2003/0174886 A1 * | 9/2003 | Iguchi et al. | | 382/167 |
| 2003/0179398 A1 * | 9/2003 | Takano et al. | | 358/1.9 |
| 2003/0235342 A1 * | 12/2003 | Gindele | | 382/260 |
| 2005/0031201 A1 * | 2/2005 | Goh | | 382/169 |
| 2005/0036173 A1 * | 2/2005 | Hayashi et al. | | 358/2.1 |
| 2005/0128539 A1 * | 6/2005 | Takano et al. | | 358/521 |
| 2005/0243352 A1 * | 11/2005 | Fujiwara et al. | | 358/1.9 |
| 2005/0280852 A1 * | 12/2005 | Namizuka | | 358/1.9 |

FOREIGN PATENT DOCUMENTS

| | | |
|---|---|---|
| JP | 10-013680 | 1/1998 |
| JP | 11-088696 | 3/1999 |
| JP | 11-243488 | 9/1999 |
| JP | 2000-165674 | 6/2000 |
| JP | 2004-146905 A | 5/2004 |

* cited by examiner

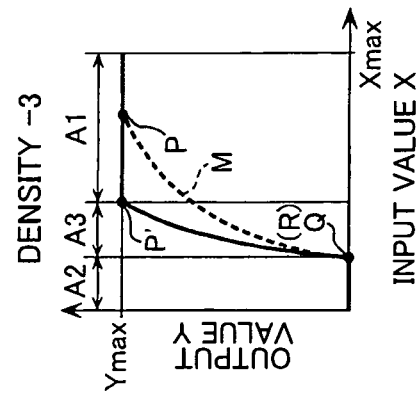
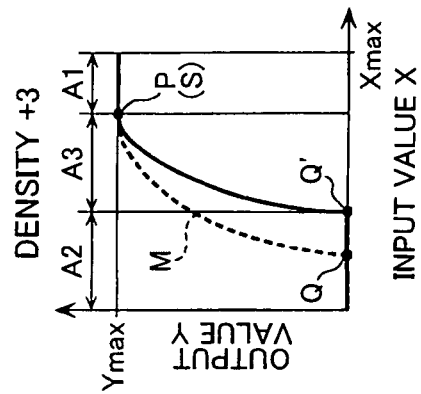
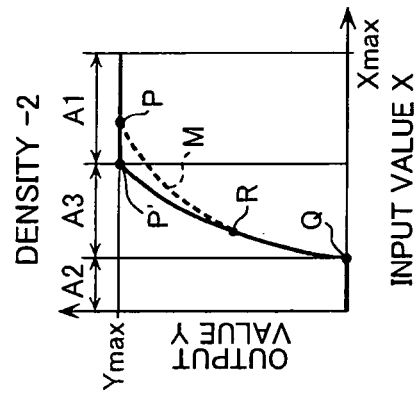
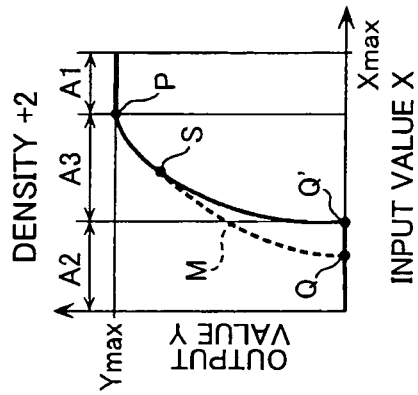
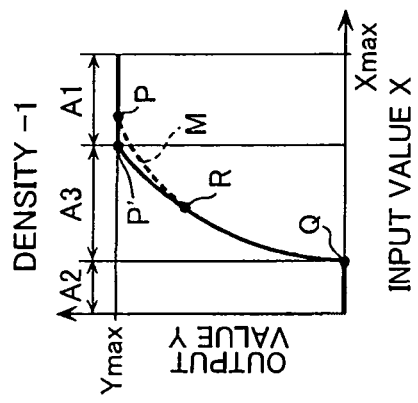
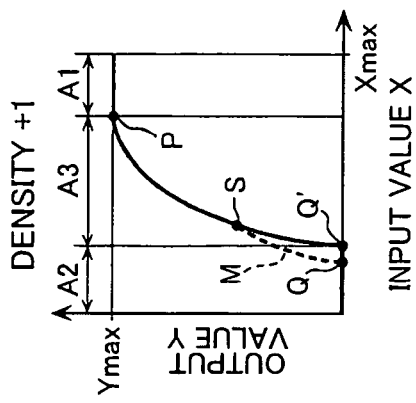
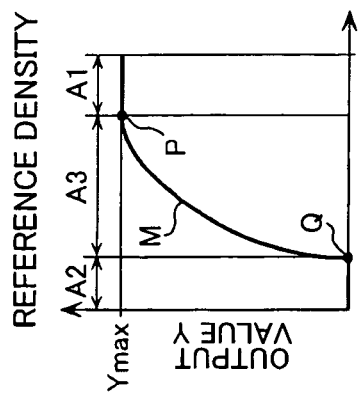

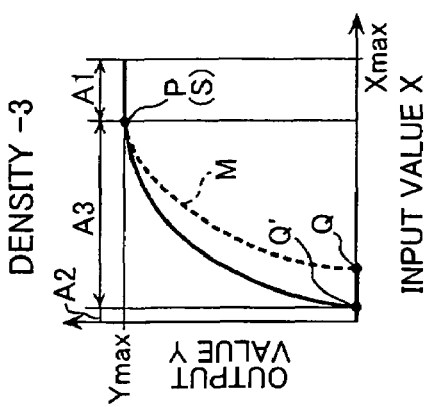
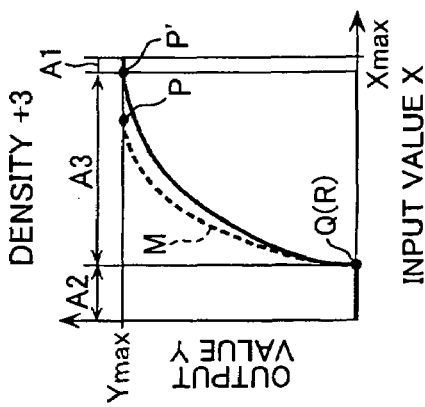
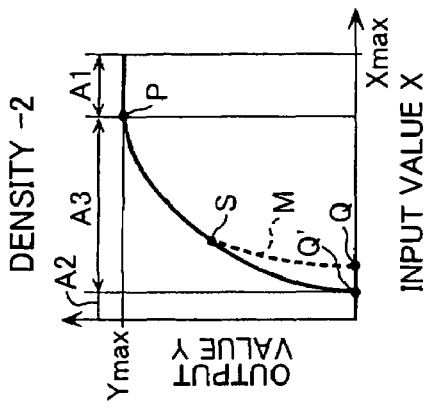
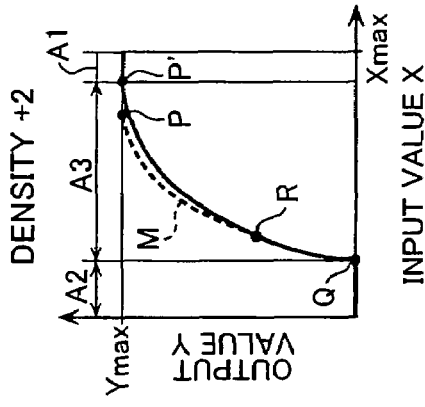
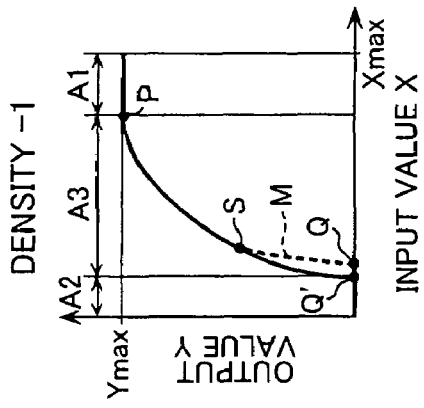
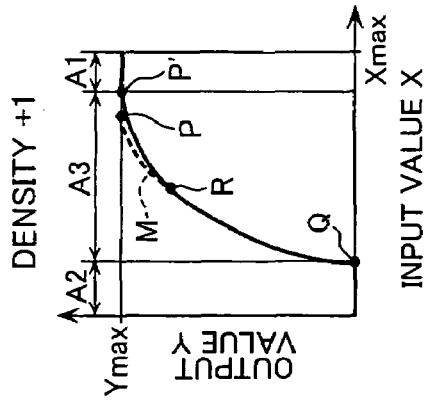
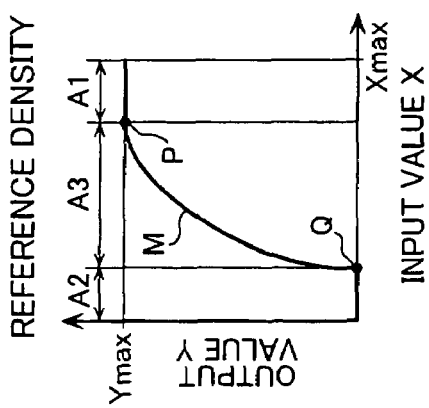

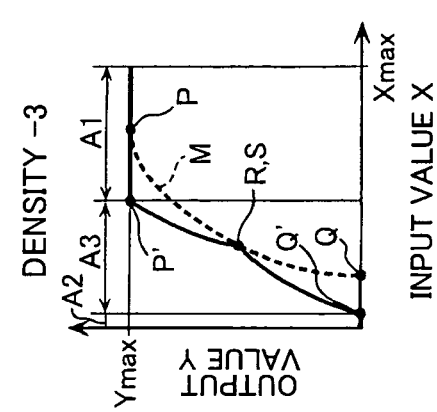
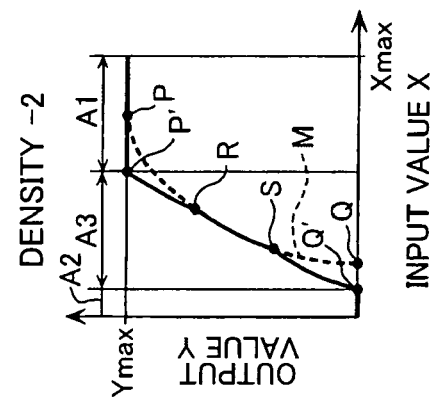
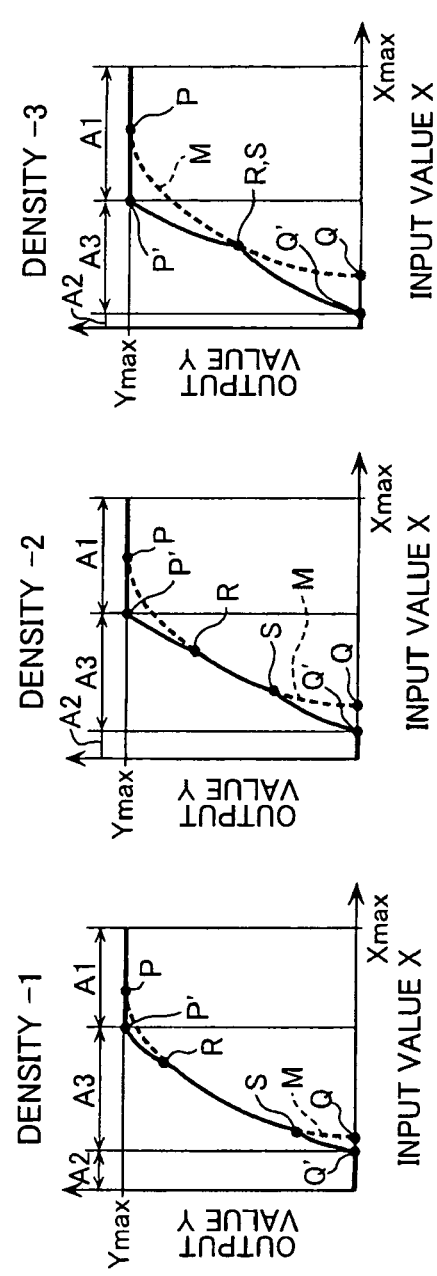
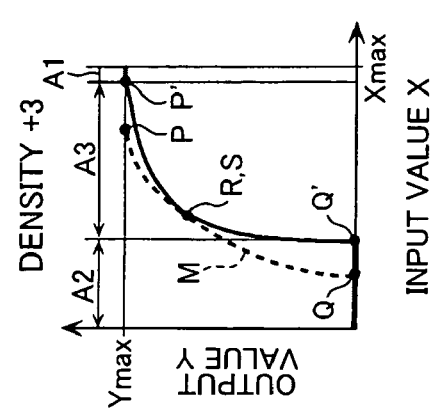
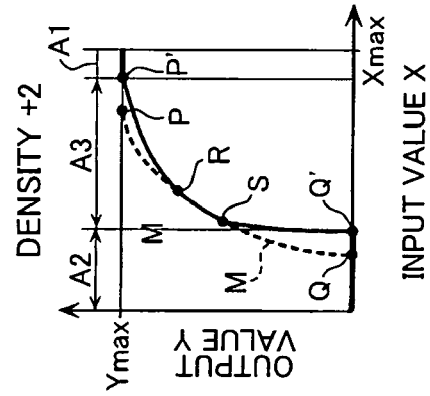
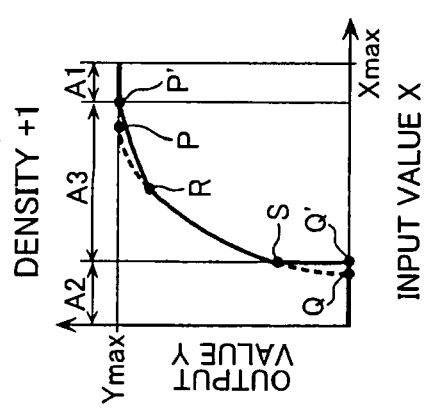
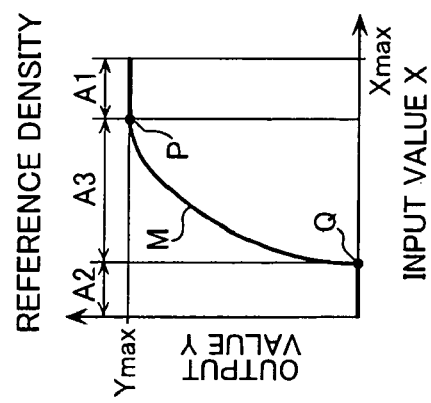

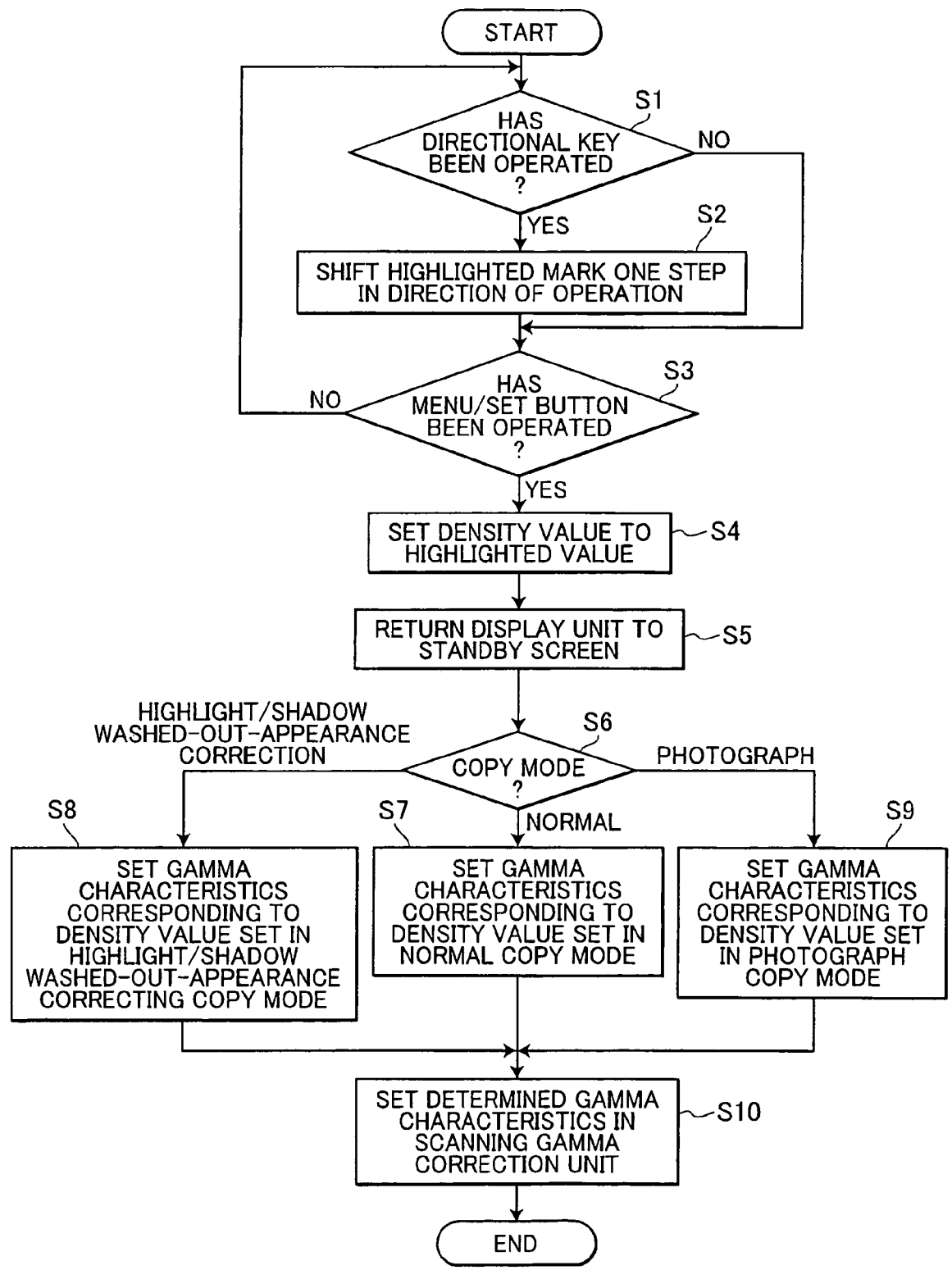

DENSITY-ADJUSTING DEVICE THAT CHANGES THE GAMMA CHARACTERISTICS OF REGIONS OF A COPIED IMAGE BASED ON A DIFFERENCE VALUE TO A SET OF MONOTONOUS GAMMA CORRECTION CURVES

BACKGROUND OF THE INVENTION

1. Field of the Invention

The present invention relates to a density-adjusting device for adjusting the density of image data for an original read by a scanner or the like, and to an image-reading device employing the density-adjusting device.

2. Description of Related Art

There is a technology used in copiers that is well known in the art for reading an original image and forming a copy of the image on a recording paper (hereinafter referred to as a "copied image") at an appropriate density. This technology involves setting reproduction characteristics based on the type of the scanned original and performing correction on the scanned image data using the set reproduction characteristics.

For example, a copying device disclosed in U.S. Pat. No. 6,222,640B1 defines reproduction characteristics having a first inflection point (first shoulder point) at the border between a black region and a halftone region and a second inflection point (second shoulder point) on the border between a white region and a halftone region. The copying device of this publication sets one set of reproduction characteristics for binary images, such as texts, and sets another set of reproduction characteristics for multilevel images, such as photographs. The copying device allows an operator to further adjust the first and second inflection points of the reproduction characteristics.

SUMMARY OF THE INVENTION

It is preferable that a copying device can adjust the density of copied images lighter to reduce noise on the white ground of the copied image or darker to record text more clearly on the copied image, while reproducing halftones with high reproducibility.

In view of the foregoing, it is an object of the present invention to provide a density-adjusting device and an image-reading device equipped with the density-adjusting device that are capable of suitably adjusting the density of an image, while reproducing halftones with high reproducibility.

In order to attain the above and other objects, the present invention provides a density-adjusting device including: a density-adjustment-value setting unit; a gamma characteristics storing unit; and a correcting unit. The density-adjustment-value setting unit is capable of setting a density adjustment value, according to which a density of image data is desired to be adjusted with respect to a predetermined reference density value. The gamma characteristics storing unit is prestored with a set of reference gamma characteristics in correspondence with the reference density value and is prestored with a plurality of sets of non-reference gamma characteristics in correspondence with a plurality of density adjustment values that can be set by the density-adjustment-value setting unit. The correcting unit corrects values of the image data by using one set of non-reference gamma characteristics that corresponds to the density adjustment value set by the density-adjustment-value setting unit, thereby adjusting the density of the image data according to the desired density adjustment value. The set of reference gamma characteristics includes: a first reference region having first reference characteristics for converting input values to a predetermined maximum output value; a second reference region having second reference characteristics for converting input values to a predetermined minimum output value; and a third reference region defined between the first and second reference regions and having third reference characteristics for converting input values to intermediate output values defined between the maximum output value and the minimum output value, the third reference characteristics defining a reference monotonous curve that changes monotonously with respect to change in the amount of the input value. The set of non-reference gamma characteristics that corresponds to each density adjustment value includes: a first region having first characteristics for converting input values to the maximum output value; a second region having second characteristics for converting input values to the minimum output value; and a third region defined between the first and second regions and having third characteristics for converting input values to intermediate output values defined between the maximum output value and the minimum output value, the third characteristics defining a monotonous curve that changes monotonously with respect to change in the amount of the input value. The amount of at least one of the first region and the second region is different from the amount of the corresponding at least one of the first reference region and the second reference region by a degree that is determined dependent on the each density adjustment value. The third characteristics is different from the third reference characteristics in at least a partial range of the third region that is next to the at least one of the first region and the second region, the at least a partial range being determined dependent on the each density adjustment value.

BRIEF DESCRIPTION OF THE DRAWINGS

The above and other objects, features and advantages of the invention will become more apparent from reading the following description of the preferred embodiment taken in connector with the accompanying drawings in which:

FIG. 4(a)-FIG. 4(g) are a series of graphs showing gamma characteristics that are used in a gamma correction process during a normal copy mode when the density of copied images is set to various densities, wherein FIG. 4(a) is a graph showing gamma characteristics used when the density of copied images is set to a reference density, FIG. 4(b) is a graph showing gamma characteristics used when the density of copied images is adjusted from the reference density in a lighter direction by one step's worth of density adjustment value, FIG. 4(c) is a graph showing gamma characteristics used when the density of copied images is adjusted from the reference density in a lighter direction by two steps' worth of density adjustment value, FIG. 4(d) is a graph showing gamma characteristics used when the density of copied images is adjusted from the reference density in a lighter direction by three steps' worth of density adjustment value; FIG. 4(e) is a graph showing gamma characteristics used when the density of copied images is adjusted from the reference density in a darker direction by one step's worth of density adjustment value, FIG. 4(f) is a graph showing gamma characteristics used when the density of copied images is adjusted from the reference density in a darker direction by two steps' worth of density adjustment value, FIG. 4(g) is a graph showing gamma characteristics used when the density of copied images is adjusted from the reference density in a darker direction by three steps' worth of density adjustment value;

FIG. 6(a)-FIG. 6(g) are a series of graphs showing gamma characteristics that are used in a gamma correction process during a highlight/shadow washed-out-appearance correcting copy mode when the density of copied images is set to various densities, wherein FIG. 6(a) is a graph showing gamma characteristics used when the density of copied images is set to the reference density, FIG. 6(b) is a graph showing gamma characteristics used when the density of copied images is adjusted from the reference density in a lighter direction by one step's worth of density adjustment value, FIG. 6(c) is a graph showing gamma characteristics used when the density of copied images is adjusted from the reference density in a lighter direction by two steps' worth of density adjustment value, FIG. 6(d) is a graph showing gamma characteristics used when the density of copied images is adjusted from the reference density in a lighter direction by three steps' worth of density adjustment value; FIG. 6(e) is a graph showing gamma characteristics used when the density of copied images is adjusted from the reference density in a darker direction by one step's worth of density adjustment value, FIG. 6(f) is a graph showing gamma characteristics used when the density of copied images is adjusted from the reference density in a darker direction by two steps' worth of density adjustment value, FIG. 6(g) is a graph showing gamma characteristics used when the density of copied images is adjusted from the reference density in a darker direction by three steps' worth of density adjustment value;

FIG. 8(a)-FIG. 8(g) are a series of graphs showing gamma characteristics that are used in a gamma correction process during a photograph copy mode when the density of copied images is set to various densities, wherein FIG. 8(a) is a graph showing gamma characteristics used when the density of copied images is set to the reference density, FIG. 8(b) is a graph showing gamma characteristics used when the density of copied images is adjusted from the reference density in a lighter direction by one step's worth of density adjustment value, FIG. 8(c) is a graph showing gamma characteristics used when the density of copied images is adjusted from the reference density in a lighter direction by two steps' worth of density adjustment value, FIG. 8(d) is a graph showing gamma characteristics used when the density of copied images is adjusted from the reference density in a lighter direction by three steps' worth of density adjustment value; FIG. 8(e) is a graph showing gamma characteristics used when the density of copied images is adjusted from the reference density in a darker direction by one step's worth of density adjustment value, FIG. 8(f) is a graph showing gamma characteristics used when the density of copied images is adjusted from the reference density in a darker direction by two steps' worth of density adjustment value, FIG. 8(g) is a graph showing gamma characteristics used when the density of copied images is adjusted from the reference density in a darker direction by three steps' worth of density adjustment value;

FIG. 10(b) is a flowchart showing steps in a process for determining one set of gamma characteristics upon receipt of an input of a user's desire to adjust the density of copied images;

DETAILED DESCRIPTION OF THE PREFERRED EMBODIMENT

Figure 1A:
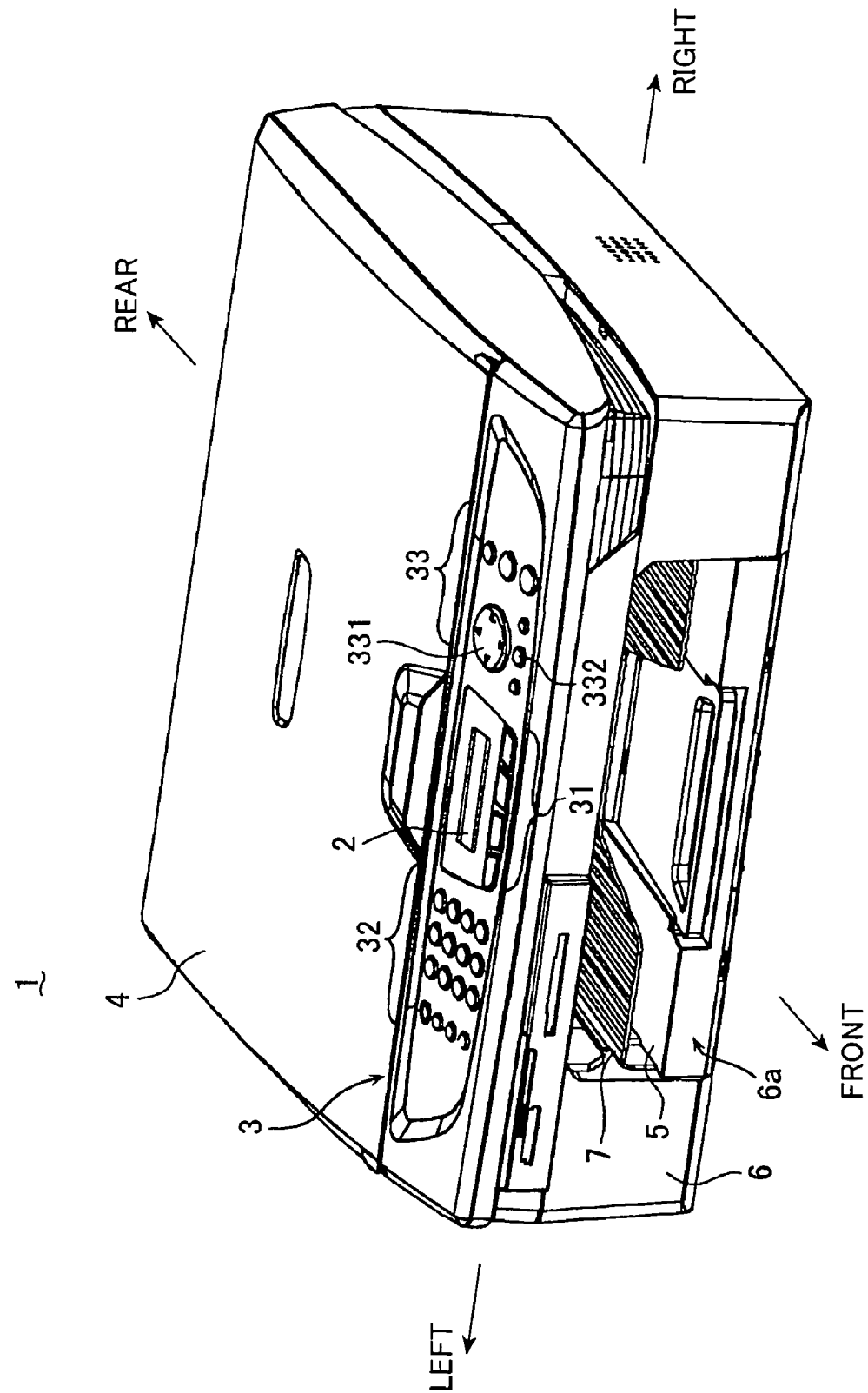
FIG. 1(a) is a perspective view showing the outer construction of a multifunction device according to an embodiment of the present invention.

A multifunction device according to a preferred embodiment of the present invention will be described while referring to the accompanying drawings wherein like parts and components are designated by the sane reference numerals to avoid duplicating description.

In the following description, the expressions "front", "rear", "upper", "lower", "right", and "left" are used to define the various parts when the multifunction device is disposed in an orientation in which it is intended to be used.

A multifunction device 1 of the present embodiment is equipped with a plurality of functions including a copier function (color copier function and monochromatic copier function), a facsimile function, a printer function, a scanner function, and the like.

The copier function has three modes including: a normal copy mode for copying an original having mainly text data (hereinafter referred to as "text documents"), such as magazines and newspapers; a photograph copy mode for copying documents that include photos and graphics (hereinafter referred to as "photographic documents"); and a highlight/shadow wash-out appearance correcting copy mode for correcting washed-out appearance in highlight (white) areas and in shadow (black) areas formed in copied images.

FIG. 1(a) is a perspective view showing the general structure of the multifunction device 1.

The multifunction device 1 has a thin box-shape and is provided with a control panel 3 and a cover 4. The control panel 3 is disposed on the top surface of the multifunction device 1 at the front end thereof and includes a display 2. The cover 4 is disposed on the top surface of the multifunction device 1 and on the rear side of the control panel 3. The cover 4 is capable of opening and closing over the multifunction device 1 about the rear edge of the cover 4. An original supporting surface (not shown in FIG. 1(a) because the cover 4 is closed) is provided on the top surface of the multifunction device 1 beneath the cover 4 for supporting an original document to be read with the scanner or copier function. A document as large as an A4-size sheet of paper an be supported on the original supporting surface.

The multifunction device 1 has a front surface 6 in which is formed an opening 6a. A paper tray 5 can be mounted in or removed from the multifunction device 1 via the opening 6a. A discharge tray 7 is provided integrally with the paper tray 5. Recording papers are fed one sheet at a time into the multifunction device 1 from the top of the paper tray 5, reversed in direction, and recorded on in the multifunction device 1, before being discharged onto the discharge tray 7. The discharged, recorded papers are thus supported on the discharge tray 7.

For the copier function and for a transmitting function in the facsimile function, the multifunction device 1 has an image-reading unit 10 (see FIG. 3) described later. The image-reading unit 10 is for reading an original supported on the original supporting surface as image data (image data for RGE components). The multifunction device 1 transmits this image data when a transmission confirmation key (not shown) is pressed.

When desiring to transmit image data for a plurality of sheets of an original document, the scanning operation is repeated the required number of times to scan image data for each of the sheets of the original document while accumulating the image data in memory, and the image data is subsequently transmitted after the transmission confirmation key has been pressed. In the preferred embodiment, each sheet of the original is placed one at a time on the supporting surface manually. However, a well-known mechanism called an automatic document feeder (ADF) may be provided on the multifunction device 1 to read the plurality of sheets of the document automatically one sheet at a time.

For the copier function and for a receiving function of the facsimile function, the multifunction device 1 has an image-recording unit 12 (see FIG. 3) described later. The image-recording unit 12 is for forming images an the recording paper loaded on the paper tray 5 according to recording image data (recording image data for CMYK components) as the paper is fed into the multifunction device 1 by a feeding mechanism (not shown). After the image-recording unit 12 forms images on the recording paper, the paper is discharged onto the discharge tray 7 in the opening 6a.

Figure 1B:
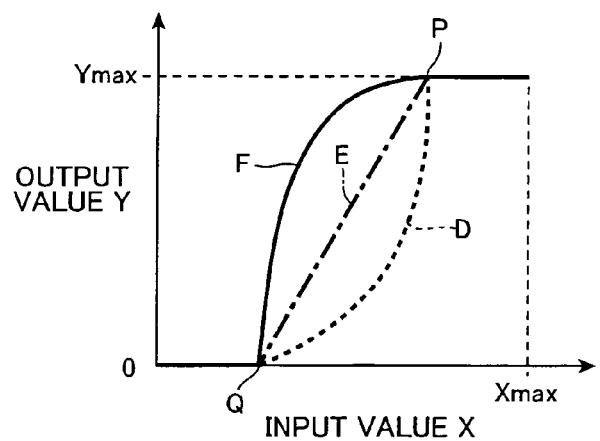
FIG. 1(b) is a graph illustrating the relationship among desirable reproduction characteristics, photoelectric conversion characteristics, and gamma characteristics.

The image-reading unit 10 scans an original to obtain RGB image data (hereinafter referred to as "scanned data") with nonlinear photoelectric conversion characteristics D indicated by a broken line in FIG. 1(b).

Figure 12:
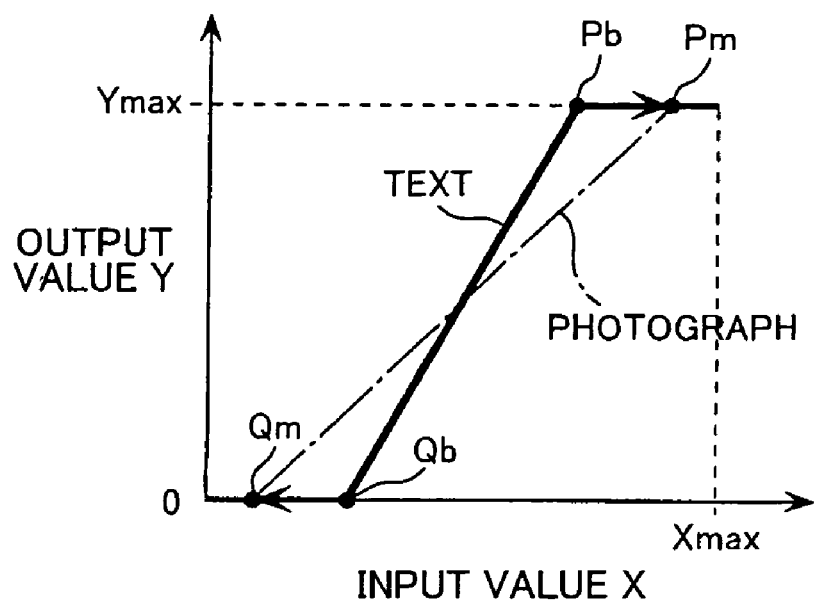
FIG. 12 is a graph illustrating an example of desirable reproduction characteristics for binary images and for multi-level images.

It is desirable that the multifunction device 1 has reproduction characteristics as indicated by a one-dot-and-one-chain line E in FIG. 12. The desirable reproduction characteristics have a black inflection point (shoulder point) Q at the border between a black region and a halftone region and a white inflection point (shoulder point) P on the border between a white region and the halftone region. The reproduction characteristics E have linear characteristics in the halftone region.

According to the present embodiment, therefore, a scanning gamma correction unit 112 in an image-processing unit 11 to be described later (FIG. 3) performs gamma correction on the scanned data by using gamma characteristics F indicated by a solid line in FIG. 1(b), so that the corrected scanned data will have the desired density characteristics E. It is noted that the gamma characteristics F is defined by the black inflection point (shoulder point) Q and the white inflection point (shoulder point) P in the desirable reproduction characteristics E of images.

It is noted that one set of default gamma characteristics is preset in the multifunction device 1. This set of default gamma characteristics will also be referred to as "reference gamma characteristics". The set of default gamma characteristics is shown in FIG. 4(a).

The multifunction device 1 has a density adjustment function for copied images in the copier function.

When a user inputs to the multifunction device 1 his/her intension not to adjust density of a copied image of an original, the scanning gamma correction unit 112 performs gamma correction on image data of the original by using the default gamma characteristics of FIG. 4(a). A resultant copied image obtained based on the corrected image data will have a corresponding density state (which will be referred to as "reference density" or "default density" hereinafter). The copied image obtained by the default gamma characteristics will be referred to as "reference copied image" hereinafter.

During the normal copy mode, if the user desires to lighten a copied image with a desired degree from the reference density, the user indicates his/her desire to lighten the copied image by inputting his/her desired lightening degree (which will be referred to as "density adjustment value" hereinafter). In this case, the scanning gamma correction unit 112 performs gamma correction on the image data by using another set of gamma characteristics shown in FIG. 4(b), 4(c), or 4(d) that corresponds to the user's inputted density adjustment value. In this case, a resultant copied image will have its white areas whiter than those in the reference copied image, and therefore will have density lighter than the reference density.

On the other hand, if the user desires to darken a copied image with a desired degree from the reference density during the normal copy mode, the user indicates his/her desire to darken the copied image by inputting his/her desired darkening degree (which will also be referred to as "density adjustment value")). In this case, the scanning gamma correction unit 112 performs gamma correction on the image data by using another set of gamma characteristics shown in FIG. 4(e), 4(f), or 4(g) that corresponds to the inputted density adjustment value. In this case, a resultant copied image will have its black areas blacker than those in the reference copied image, and therefore will have density darker than the reference density.

During the highlight/shadow washed-out-appearance correcting copy mode, if the user desires to lighten a copied image with a desired degree from the reference density and indicates his/her desire to lighten the copied image by inputting his/her desired density adjustment value, the scanning gamma correction unit 112 performs gamma correction on the image data by using another set of gamma characteristics shown in FIG. 6(b), 6(c), or 6(d) that corresponds to the inputted density adjustment value. In this case, a resultant copied image will have its dark areas becoming lightened to appear clearly in its black background, and therefore will have density lighter than the reference density.

Also during the highlight/shadow washed-out-appearance correcting copy mode, if the user desires to darken the a copied image with a desired degree from the reference density and indicates his/her desire to darken the copied image by inputting his/her desired density adjustment value, the scanning gamma correction unit 112 performs gamma correction on the image data by using another set of gamma characteristics shown in FIG. 6(e), 6(f), or 6(g) that corresponds to the inputted density adjustment value. In this case, a resultant copied image will have its light areas becoming darkened to clearly appear in its white background, and therefore will have density darker than the reference density.

During the photograph copy mode, if the user desires to lighten a copied image with a desired degree from the reference density and indicates his/her desire to lighten the copied image by inputting his/her desired density adjustment value, the scanning gamma correction unit 112 performs gamma correction on the image data by using another set of gamma characteristics shown in FIG. 8(*b*), 8(*c*), or 8(*d*) that corresponds to the inputted density adjustment value. In this case, a resultant copied image will have its white areas whiter than those in the reference copied image and therefore will have density lighter than the reference density, while retaining the gradations in a photographic original.

Also during the photograph copy mode, if the user desires to darken a copied image with a desired degree from the reference density and indicates his/her desire to darken the copied image by inputting his/her desired density adjustment value, the scanning gamma correction unit 112 performs gamma correction on the image data by using another set of gamma characteristics shown in FIG. 8(*e*), 8(*f*), or 8(*g*) that corresponds to the inputted density adjustment value. In this case, a resultant copied image will have its black areas blacker than those in the reference copied image and therefore will have density darker than the reference density, while retaining the gradations in a photographic original.

Figure 3:
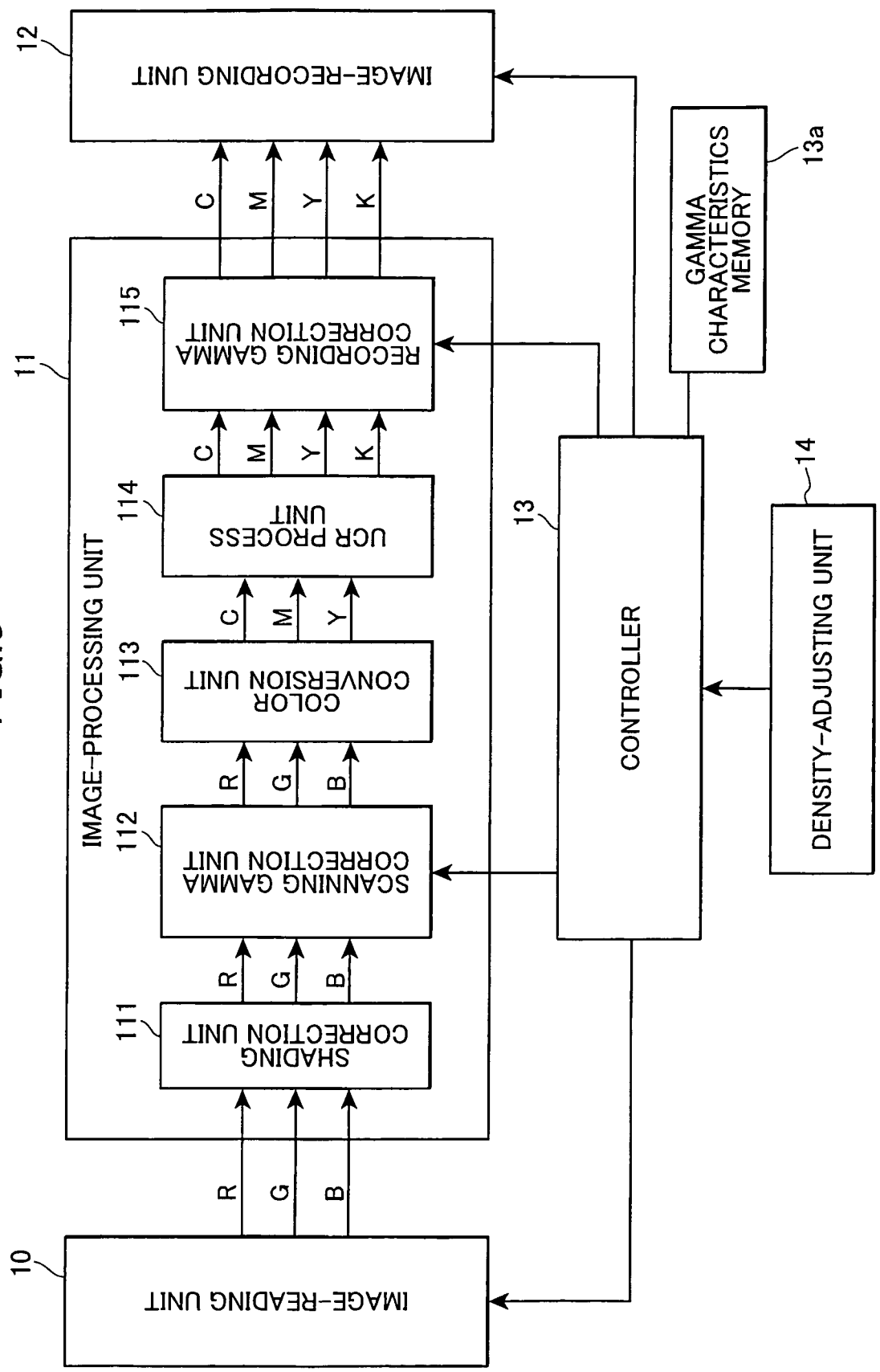
FIG. 3 is a block diagram illustrating the copier function of the multifunction device.

Although not shown in the drawings, the multifunction device 1 has a main central processing unit (CPU), a ROM, and a RAM. The ROM has a memory region that is prestored with data of nineteen types of gamma characteristics of FIG. 4(*a*) and FIG. 4(*b*)-FIG. 4(*g*), FIG. 6(*b*)-FIG. 6(*g*), and FIG. 8(*b*)-FIG. 8(*g*) as will be described later. Thus, the memory region serves as a gamma characteristics memory 13*a* in FIG. 3. The ROM has another memory region that is prestored with data of programs of FIGS. 10(*a*), 10(*b*), and 11. By executing the program of FIG. 10(*b*) while using the RAM, the CPU serves as a controller 13 (FIG. 3). By executing the program of FIG. 11 while using the RAM, the CPU serves as the image-processing unit 11 (FIG. 3).

The display 2 is disposed in the center of the control panel 3, and is configured of a liquid crystal display having a plurality of pixels arranged in a matrix. The display 2 functions to display various information using characters and symbols rendered in dot images. Representative examples of the information include; date and time; various settings data which should be reported to the user for the various functions (such as the address and telephone number in the facsimile function, the number of copies in the copier function, etc.); operating status; and error messages.

A control section 31 is disposed on the control panel 3 beneath the display 2. Other control sections 32 and 33 are disposed on the left and right sides of the control panel 3. Each control section 31, 32, and 33 is configured of a plurality of operating buttons. The control section 31 enables the user to select one from among four functions: facsimile function; copier function; scanner function; and a "photograph printing function" that is used to print images that have been taken by a digital camera. The control section 31 includes four operating buttons corresponding to each of these four functions.

The control section 32 allows the user to perform operations related primarily to the telephone. The control section 32 is configured of sixteen operating buttons, including four operating buttons arranged on the left side for turning the power on and off and performing redial, on-hook, and other functions; and a common twelve-button numeric keypad on the right side for inputting telephone numbers and the like.

The control section 33 enables the user to perform operations primarily related to image recording and to set various conditions for each of the functions. The control section 33 includes six operating buttons and a single directional key 331. Three of these operating buttons disposed on the right side function to stop the copying process, to specify color copying, and to specify monochrome copying. The directional key 331 is disposed adjacent to the display 2 on the right side thereof.

Beneath the directional key 331 are three operating buttons for selecting processing conditions for each of the functions.

More specifically, the center operating button beneath the directional key 331 is a menu/set button 332 for displaying a menu on the display 2 and confirming settings for categories selected in the menu.

The menu displayed on the display 2 includes: selection items used for adjusting the density of a copied image; selection items for density adjustment values; and selection items for copy modes (normal copy mode, photograph copy mode, and highlight/shadow washed-out appearance correcting copy mode). Part of the menu is displayed in the display 2 when the menu/set button 332 is pressed.

The directional key 331 functions both as a scroll key for scrolling the screen displayed on the display 2 in order to display hidden parts of the menu, and as a selection key for selecting a desired item from among the plurality of displayed selection items.

Figure 2:
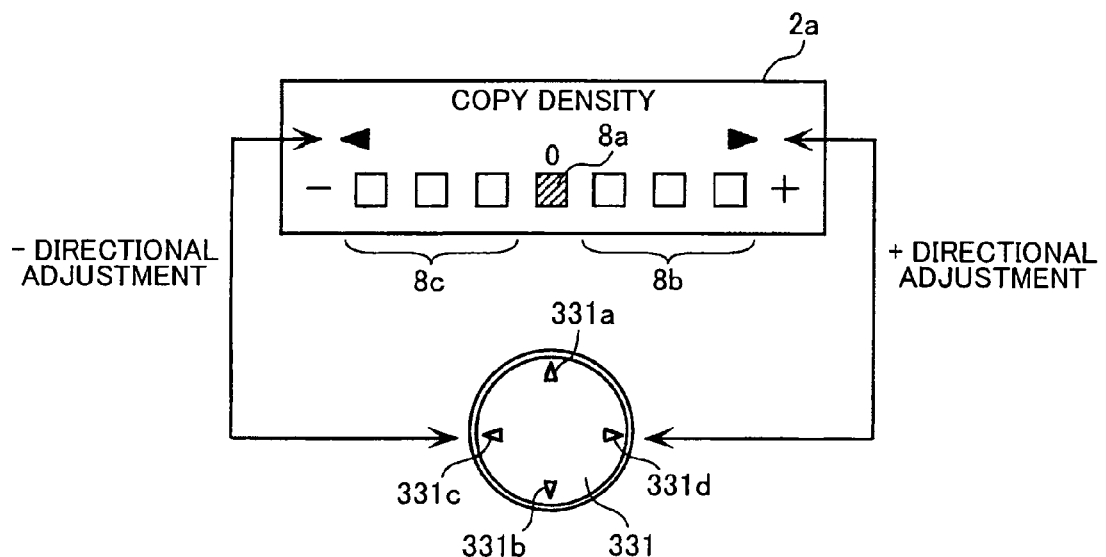
FIG. 2 is an explanatory diagram showing a sample screen display for adjusting the density of copied images.

As shown in FIG. 2, the directional key 331 has an up key 331*a*, a down key 331*b*, a left key 331*c*, and a right key 331*d*. The up and down keys 331*a* and 331*b* are used for scrolling the menu in the display 2, as well as for displaying a selection on the display 2 for adjusting the density of copied images.

For setting various conditions, the user can display the menu on the display 2 by operating the menu/set button 332, make a desired selection using the up/down keys 331*a* and 331*b* of the directional key 331, select a desired condition value with the left/right keys 331*c* and 331*d*, and set this value with the menu/set button 332.

The copy mode can be set in a manner described below.

First, the user operates the menu/set button 332 to display the menu on the display 2. When the user chooses the selection items for copy modes by manipulating the up/down keys 331*a* and 331*b*, the copy mode setting process of FIG. 10(*a*) is started.

Figure 10A:
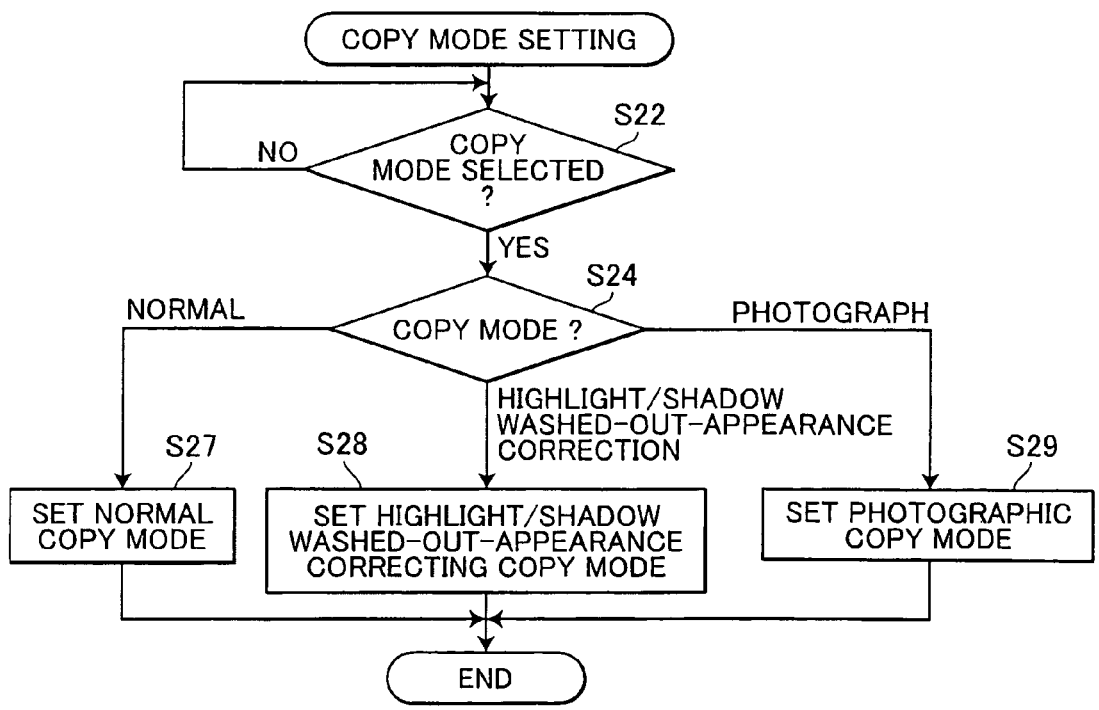
FIG. 10(a) is a flowchart showing steps in a process for setting a copy mode upon receipt of an input of a user's desire for selecting a copy mode.

As shown in FIG. 10(*a*), when the user selects his/her desired copy mode by operating the left/right keys 331*c* and 331*d* and finally sets his/her desired mode with the menu/set button 332 (yes in S22), the CPU judges the copy made in S24. When the copy mode is the normal copy mode, the normal copy mode is set in S27. When the copy mode is the highlight/shadow washed-out-appearance correcting copy mode, the highlight/shadow washed-out-appearance correcting copy mode is set in S28. When the copy mode is the photograph copy mode, the photograph copy mode is set in 329.

FIG. 2 shows a sample display screen 2*a* or the display 2 used for adjusting the density of copied images.

A text display "Copy Density" at the top of the display screen 2*a* indicates the name of the selection for density adjustment. Seven square marks 8 representing density adjustment values are displayed in the longer section of the display screen 2*a*. The multifunction device 1 enables the density to be adjusted from a preset reference density (default) by three steps of a prescribed pitch in either the darker direction (-direction) or lighter direction (-direction). A center density adjustment mark 8*a* denotes the reference density. Three density adjustment marks 8*c* on the left side of the center density adjustment mark 8*a* denote adjustment steps in the lighter direction from the reference density, while three density adjustment marks 8*b* on the right side of the center density adjustment mark 8*a* denote adjustment steps in the darker direction from the reference density.

The currently selected mark 8 is displayed as a filled in black square in the example shown in FIG. 2, the reference density has been selected. Each time the right key 331*d* of the directional key 331 is pressed, the density adjustment value moves one step in the darker direction. Each time the left key 331*c* is pressed, the density adjustment value moves one step in the lighter direction. Once the desired mark 8 has been highlighted in black, the user can press the menu/set button 332 to set this density adjustment value.

In this way, the user can designate his/her desire to adjust the density of copied images to one of seven different stages, including the reference density. Accordingly, the multifunction device 1 has, for each of the three copy modes, seven types of gamma characteristics for seven density adjustment values, and performs gamma correction on image data for the RGB color components using one set of gamma characteristics that corresponds to a combination of one copy mode and one density adjustment value that has been set for copied images.

The seven types of gamma characteristics for the normal copy mode are shown in FIGS. 4(*a*)-4(*g*), the seven types of gamma characteristics for the highlight/shadow washed-out-appearance correcting copy mode are shown in FIGS. 6(*a*)-6(*g*), and the seven types of gamma characteristics for the photograph copy mode are shown in FIGS. 8(*a*)-8(*g*).

It is noted that gamma characteristics for the reference density are the same as one another for all the copy modes. In other words, the reference gamma characteristics of FIGS. 4(*a*), 6(*a*), and 8(*a*) are the same as one another.

On the other hand, for each of the six density values other than the reference density value, gamma characteristics of FIG. 4(*b*)-FIG. 4(*g*) for the normal copy mode, gamma characteristics of FIG. 6(*b*)-FIG. 6(*g*) for the photograph copy mode, and gamma characteristics of FIG. 8(*b*)-FIG. 8(*g*) for the highlight/shadow washed-out-appearance correcting copy mode differ from one another.

Figure 9:
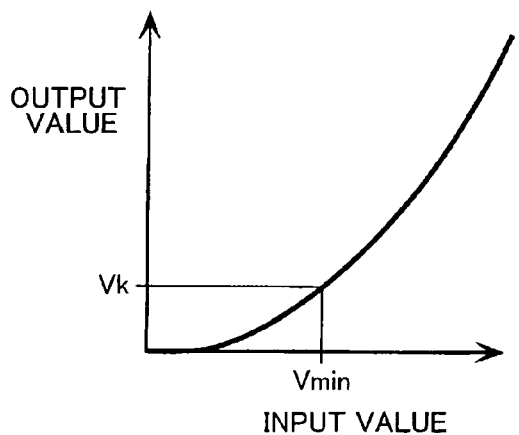
FIG. 9 is a graph showing an example of conversion properties for determining an image data value for black color component.

Hence, the gamma characteristics memory 13*a* is prestored with a total of nineteen types of gamma characteristics, including: one type of reference gamma characteristics for the reference density (FIG. 4(*a*)); and six types of gamma characteristics for each copy mode corresponding to the six types of density adjustment values other than the reference density (FIG. 4(*b*)-FIG. 4(*g*), FIG. 6(*b*)-FIG. 6(*g*), and FIG. 8(*b*)-FIG. 9(*g*)). These gamma characteristics will be described in greater detail later.

FIG. 3 is a block diagram showing elements related to the copier function of the multifunction device 1.

Components involved in the copier function include the image-reading unit 10, the image-processing unit 11, the image-recording unit 12, the controller 13, the gamma characteristics memory 13*a*, and the density-adjusting unit 14.

The controller 13 performs centralized control for driving the image-reading unit 10, image-processing unit 11, and image-recording unit 12 in order to perform a copy operation. The controller 13 is implemented with the main CPU (not shown) of the multifunction device 1.

The density-adjusting unit 14 functions to adjust the density of copied images, and is configured of a function for displaying the density adjustment screen (see FIG. 2) on the display screen 2*a*, and the directional key 331 that enables a user to perform operations in this density adjustment screen.

When an operating button for a main power source as operated to start up the multifunction device 1, the density-adjusting unit 14 automatically supplies data of the reference density, as a default value, into the controller 13.

When the user displays the density adjustment screen on the display 2 and modifies the density for copied images (including restoring the reference density) by operating the left/right keys 331*c* and 331*d* of the directional key 331 and the menu/set button 332, data for the newly-set density adjustment value is inputted from the density-adjusting unit 14 to the controller 13.

Upon receipt of the newly-set density adjustment value, the controller 13 selects one set of gamma characteristics that is stored in the gamma characteristics memory 13*a* in correspondence with the density adjustment value and in correspondence with the presently-set copy mode, and sets the selected gamma characteristics set in the scanning gamma correction unit 112.

The image-reading unit 10 reads an original document laid on the original supporting surface, which is exposed when the cover 4 is opened. Although not shown in the drawings, the image-reading unit 10 includes a color image sensor, a drive controlling unit, and a signal processing unit. The color image sensor includes: an illuminating unit such as a white light source for illuminating the original document supported on the original supporting surface; and photoelectric conversion elements that receive the light reflected from the original document and that convert images on the original to image signals. The drive controlling unit is for controlling image reading operations of the color image sensor. The signal processing unit is for performing prescribed signal processes, such as an amplification process and an analog-to-digital conversion process, on the image signals received from the color image sensor.

In this example, a short edge of the original supporting surface extends in the front-to-rear direction (image-reading main scanning direction), and a long edge of the original supporting surface extends in the left-to-right direction (image-reading sub-scanning direction).

The color image sensor extends along the front-to-rear direction (image-reading main scanning direction), and includes; a white light source; a CCD line image sensor capable of reading approximately the same length as the widthwise dimension of an A4-size sheet of paper; and RGE color filters disposed on the exposed surface of the CCD line image sensor. The image-reading unit 10 scans an image on the original document by moving the color image sensor in the left-to-right direction (image-reading sub-scanning direction) relative to the document while repeatedly imaging the document on the original supporting surface with the color image sensor (capturing images in units of front-to-rear extending lines).

The image-reading unit 10 reads image signals (analog signals of received light for each pixel) from the CCD line image sensor, and performs various processes for amplifying the analog signals and converting the analog signals to digital signals by performing an analog-to-digital conversion on the received light signals to convert the light signals to gradation values of eight bits, for example. Subsequently, the image-reading unit 10 outputs the resulting signals to the image-processing unit 11.

The image-processing unit 11 performs shading correction on the color image data inputted from the image-reading unit 10. The color image data inputted from the image-reading unit 10 is image data for the RGB color components and therefore is defined in an additive color system. Based on the shading-corrected color image data of the additive color system, the image-processing unit 11 generates color image data for the CMYK color components, which is of a subtractive color system and is used for recording images with the image-recording unit 12.

The image-processing unit 11 includes: a shading correction unit 111; the scanning gamma correction unit 312 for performing gamma correction on image data for the RGB color components; a color conversion unit 113 for converting the image data for the RGB color components to image data for the CMY color components; a UCR process unit 114 for performing an under color removal process on the image data for the CMY color components in order to reduce the amounts of the CMY color components and replace the reduced parts with black data; and a recording gamma correction unit 115 for performing gamma correction on the image data for the CMYK color components.

The shading correction unit 111 performs shading correction on the image data inputted from the image-reading unit 10 (scanned data). The shading correction unit 111 sets image data for a reference white scanned by the image-reading unit 10 as the maximum level (reference white level) and image data outputted from the image-reading unit 10 when scanning in a dark state to the minimum level (reference black level). Levels of recording data inputted from the image-reading unit 10 (levels of light received for each pixel) are corrected to halftone levels within the range between the reference black level and the reference white level. The shading correction unit 111 performs shading correction on image data for each of the R, G, and B color components.

The scanning gamma correction unit 112 performs gamma correction on the scanned data that has undergone shading correction by using a set of gamma characteristics that is set by the controller 13. The scanning gamma correction unit 112 performs gamma correction on each of the RGB color components.

The color conversion unit 113 functions to convert image data for the RGB color components, which have undergone gamma correction by the scanning gamma correction unit 112, to image data for CMY color components using the following equations (1)-(3):

$$V_C = (1 - V_R/V_{Rmax}) \quad (1)$$

$$V_M = (1 - V_G/V_{Gmax}) \quad (2)$$

$$V_Y = (1 - V_B/V_{Bmax}) \quad (3)$$

wherein $V_C$, $V_M$, $V_Y$ are normalized levels of density (gradation) for the three subtractive colors of cyan, magenta, and yellow, $V_R$, $V_G$, $V_E$ are inputted levels of density (gradation) for the three additive colors of red, green, and blue, and $V_{Rmax}$, $V_{Gmax}$, and $V_{Bmax}$ are maximum levels of density (gradation) for the RGB image data.

In this example, the scanned data is configured of 8-bit data, the maximum density levels $V_{Rmax}$, $V_{Gmax}$, and $V_{Bmax}$ are 255. Accordingly, image data for the CMY color components are calculated according to $V_C = 1 - V_R/255$, $V_M = 1 - V_G/255$, and $V_Y = 1 - V_B/255$.

The UCR process unit 114 functions to generate image data for the K Color component based on the value for image data of the color component having the minimum value among the CMY color components. The UCR process unit 114 also generates recording image data by modifying the image data for the CMY color components using image data value for the K color component.

More specifically, the UCR process unit 114 possesses correction characteristics for determining the value of the K color component as shown in FIG. 9. The UCR process unit 114 calculates an output value using the minimum $V_{min}$ of the image data for the CMY color components as an input value for the correction characteristics and generates image data for the K color component possessing this output value. In this example, the output value $V_K$ is set to zero (0) until the input value $V_{min}$ reaches a predetermined value.

For example, if the image data for the C color component has she smallest value among the CMY color components, then the UCR process unit 114 calculates the output value $V_K$ using this image data $V_C$ as the input value $V_{min}$ for the conversion characteristics, generates image data for the K color component having this output value $V_K$. The UCR process unit 114 also subtracts $V_K$ from image data for the CMY color components and generates recording image data for the CMY color components. Accordingly, the values of recording image data for the CMY color components are $(V_C - V_K)$, $(V_M - V_K)$, and $(V_Y - V_K)$, respectively.

The recording gamma correction unit 115 performs gamma correction on recording image data for the CMYK color components. The recording gamma correction unit 115 has reference gamma characteristics for each of the CMYK color components. These reference gamma characteristics are set based on the recording characteristics of the image-recording unit 12 to correct the nonlinear gradation characteristics of copied images, which are generated due to the nonlinear recording characteristics of the image-recording unit 12, into linear gradation characteristics. The recording gamma correction unit 115 performs gamma correction on the recording image data, which has been outputted from the UCR process unit 114, using the reference recording gamma characteristics with no regard for the density adjustment value set in the density-adjusting unit 14.

The image-recording unit 12 then forms color images on a recording paper based on recording image data for each of the CMYK color components outputted from the recording gamma correction unit 115. The image-recording unit 12 is configured of a color printer employing an inkjet method, bat is not limited to this method. For example, the color printer applied to the image-recording unit 12 may be any of numerous types employing an electrostatic photographic printing method, an ink ribbon printing method, a thermal transfer printing method, and the like.

The image-recording unit 12 is capable of moving in a direction (hereinafter referred to as a main scanning direction) orthogonal to the direction in which the recording paper is conveyed. The image-recording unit 12 includes a print head for ejecting ink of the CMYK color components onto the recording paper, a drive controller for controlling movement of the print head in the main scanning direction, and a recording controller for controlling ejection of each ink color from the print head based on the recording image data for the CMYK color components.

The print head is cubic in shape having a prescribed width dimension and includes four nozzles formed in the surface facing the recording paper for ejecting ink of the CMYK colors. Ink cartridges supply ink of the CMYK colors to the respective nozzles. When forming images on the recording paper, the drive controller repeatedly moves the print head reciprocatingly in the main scanning direction over the recording paper at a prescribed rate of speed. The recording controller controls the print head to eject ink of each color onto the recording paper based on recording image data for the CMYK color components at a timing synchronized with the speed at which the print head moves in the main scanning direction, thereby recording one line worth of an image. Each time the print head has recorded one line worth of an image, the recording paper is conveyed exactly one line worth.

Thereafter, the operations for recording one line worth of an image with the print head and for conveying the recording paper one line worth are repeated to record the entire image on the recording paper. If a plurality of nozzles is provided in the print head for each color, a plurality of lines can be recorded simultaneously. In such a case, the amount for conveying the recording paper is modified accordingly.

Next will be described, with reference to FIG. 4(a)-FIG. 8(g), the gamma characteristics that the scanning gamma correction unit 112 uses when performing the gamma correction process.

First will be described, with reference to FIG. 4(a)-FIG. 4(g), the gamma characteristics that the scanning gamma correction unit 112 uses in the gamma correction process during the normal copy mode.

FIG. 4(a) shows a graph of the reference gamma characteristics. FIG. 4(b)-FIG. 4(d) show the gamma characteristics corresponding to density adjustment values for the copy image adjusted in steps toward the lighter direction. FIG. 4(e)-FIG. 4(g) show graphs of gamma characteristics corresponding to density adjustment values for the copy image adjusted in steps toward the darker direction. It is noted that the waveform indicated by a dotted line in FIG. 4(b)-FIG. 4(g) denotes the reference gamma characteristics, that is, the waveform indicated by a solid line in FIG. 4(a).

In each graph of the gamma characteristics, the horizontal axis represents input values X, while the vertical axis represents output values Y. Both values have been normalized to have a maximum value of 1.0. It is noted that the maximum value for original, 8-bit image data is 255.

In each graph, a region A1 is a white region in which the input values X are converted to a maximum output value $Y_{max}$ irrespective of changes in the input values X. A region A2 is a black region in which input values X are converted to a minimum output value $Y_{min}$, (0 in the preferred embodiment) irrespective of changes in the input values X. A region A3 is a halftone region in which the input values X are converted to intermediate output values Y satisfying a curve that changes monotonously.

In the reference gamma characteristics shown in FIG. 4(a), the white region A1 is saturated at the maximum output valve $Y_{max}$; the black region A2 is saturated at the minimum output value $Y_{min}$ (0); and the halftone region A3 has the characteristics of an arc curving or protruding upward (hereinafter referred to as "halftone characteristics M"), The halftone characteristics M are set, according to the scanning characteristics of the image sensor, in order to correct, into linear gradation characteristics, nonlinear gradation characteristics of scanned data, which are generated due to the nonlinear reading characteristics of the image sensor in the image-reading unit 1C.

In this example, the density adjustment values for each step in the lighter direction from the default reference density will be called "density-1," "density-2," and "density-3."

As shown in FIG. 4(b), the gamma characteristics for "density-1" are set by shifting a white inflection point (shoulder point) P of the reference gamma characteristics to a lower value P' in a direction parallel to the horizontal axis, setting a point R a distance from the white inflection point P along the halftone characteristics M, and replacing the section of the halftone characteristics M from the point R to the white region A1 side with a curve connecting the shifted inflection point P' with the point R. The amount that the white inflection point P is shifted to the new white inflection point P' in a direction parallel to the horizontal axis and the amount that the point R is shifted from the original white inflection point P along the halftone characteristics M are determined dependent on the amount of density adjustment from the reference density.

In the graph of "density-1," the waveform of the gamma characteristics in the region less than or equal to the input value corresponding to the point R is identical to the reference gamma characteristics, but the waveform in the region greater than the input value corresponding to the point R differs from the reference gamma characteristics. The difference in the waveform from the reference gamma characteristics is generated by expanding the white region A1 and increasing the output values corresponding to input values at the end of the halftone characteristics M near the white region A1.

Therefore, gamma correction performed with the "density-1" characteristics is the same as that performed with the reference density for the halftone portions and black portions of the original document, but makes white portions and near-white portions of the document whiter than gamma correction with the reference density. In this way, the white ground of the original can be made whiter without adversely affecting gamma correction of the scanned data. This gamma correction can prevent black spots or other noise from entering white portions, while appropriately adjusting gradations in halftone areas of the original.

Next will be described, with reference to FIG. 5(c), a comparative method of changing gamma characteristics from the reference gamma characteristics in the lighter direction.

In the comparative method, the white inflection point P is shifted to a lower value P'. The entire part of the waveform of the halftone characteristics M, indicated by a solid line in the drawing, is changed so that the shifted position P' connects with the fixed black inflection point Q as indicated by a broken line.

In this case, the characteristics near the black inflection point Q also change so that the output values will increase rapidly with respect to the input values near the black inflection point Q. Hence, even if the user only wishes to adjust the density so that only the white areas of the image become whiter, all the halftone regions of the image will also be corrected to be whiter, and the contours of the black regions will become more pronounced, producing an image with an overall strong contrast.

Gamma characteristics for "density-2" and "density-3" are varied from the reference gamma characteristics according to the same concept used for "density-1."

More specifically, as shown in FIGS. 4(c) and 4(d), as the amount of density adjustment increases, the amount that the white inflection point P shifts toward a lower value P' increases, as does the amount that the point R moves away from the white inflection point P. In the gamma characteristics for "density-3," the point R is equivalent to a black inflection point Q.

In this way, also for "density-2" and "density-3", the amount that the white inflection point P is shifted to the new white inflection point P' parallel to the horizontal axis and the amount that the point R is shifted from the original white inflection point P along the halftone characteristics M are determined dependent on the amount of density adjustment from the reference density.

Figure 5A:
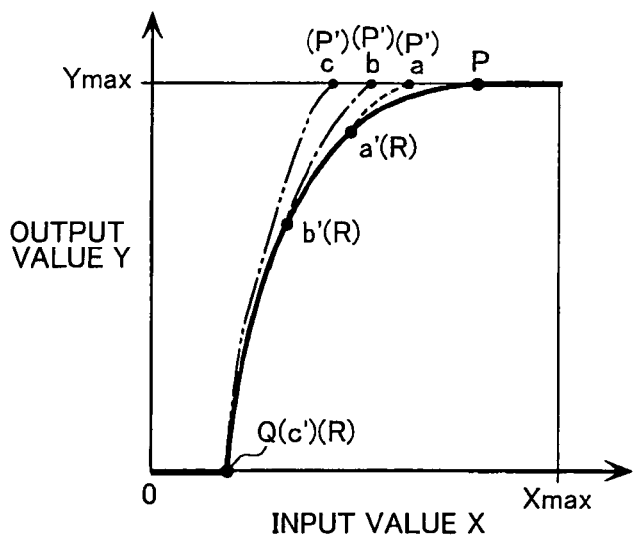
FIG. 5(a) is a graph showing how to change gamma characteristics in the normal copy mode when the density is adjusted in the lighter direction.

As shown in FIG. 5(a), the gamma characteristics of "density-1" through "density-3" increase only the white region A1 from the reference gamma characteristics (indicated by a solid line in FIG. 5(a)) as the amount of density adjustment from the reference density increases, and changes the waveform in the halftone region A3 for the section of the halftone characteristics M near the white region to have a greater slope as the amount of density adjustment from the reference density increases. In other words, gamma characteristics are changed from the reference gamma characteristics based on the density adjustment value by changing only a portion of the waveform for the halftone characteristics M according to the density adjustment value. More specifically, the gamma characteristics are changed to increase the slope of the waveform in a portion of the halftone characteristics M near the white region as the density adjustment value increases, while leaving as much of the halftone characteristics M in the reference gamma characteristics as possible.

More specifically, as the amount of density adjustment from the reference density increases, the gamma characteristics are changed from the reference gamma characteristics so that the white inflection point P is shifted parallel to the horizontal axis to lower values at positions a, b, and c (P'). Further, positions a', b', and c' (R) are provided on the halftone characteristics M corresponding to the respective shifted positions a, b, and c of the white inflection point P, and the reference gamma characteristics are modified so that the shifted position P' of the white inflection point P is connected to the corresponding point R on the halftone characteristics M, that is, point a is connected to point a', b to b', or c to c'. The positions of a', b', and c' corresponding to the positions of a, b, and c, to which the white inflection point P is shifted sequentially, are set to satisfy the expressions Xa'<Xa, Xb'<Xb, and Xc'<Xc, where Xa, Xb, and Xc are input values corresponding to positions a, b, and c and Xa', Xb', and Xc' are input values corresponding to positions a', b', and c'.

When the white inflection point P is shifted to lower values at positions a and b as the amount of density adjustment from the reference density increases, if the overall waveform of the halftone characteristics M were changed, as indicated by a broken line in FIG. 5($c$), so that the shifted positions a and b connect with the black inflection point Q directly, then the characteristics near the black inflection point Q will also charge so that the output values will increase rapidly with respect to the input values. Hence, even if the user only wishes to adjust the density so that only the white areas of the image become whiter, all the halftone regions of the image are also corrected to be whiter, and the contours of the black regions become more pronounced, producing an image with an overall strong contrast.

However, in the preferred embodiment, as the amount of density adjustment from the reference density increases through "−1" to "−2", the white region A1 is increased but only part of the waveform for the halftone characteristics M is changed near the white region, thereby achieving a density adjustment that makes only white regions of the image whiter.

Here, the position of the point R on the halftone characteristics M is moved from a' through b' to c' downward as the white inflection point P is shifted lower from a through b to c. More specifically, if the point R on the halftone characteristics M were fixed even when the white inflection point P is shifted to a lower value, the slope of the curve connecting the point R on the halftone characteristics M to the shifted position P' of the white inflection point P would become too great, making the section of the waveform between the shifted point P' and the point R on the halftone characteristics M differ too greatly from the original waveform of the halftone characteristics M and result in a too much pronounced contrast in the white areas. The present embodiment prevents this by shifting the position of the point R on the halftone characteristics M downward from a' through b' to c' as the position of the white inflection point P' shifts lower from a through b to c. Accordingly, the rate of change in the slope of the section connecting points P' and R gradually increases from point P' to point R. That is, the rate of change in the slope of the section connecting points a and a' gradually increases from point a to point a', the rate of change in the slope of the section connecting points b and b' gradually increases from point b to point b', and the rate of change in the slope of the section connecting points c and c' gradually increases from point c to point c'.

Since the waveform of the reference gamma characteristics is set in correspondence with the nonlinear reading characteristics of the image-reading unit 10 for correcting these characteristics, the multifunction device 1 can perform such a density adjustment that makes only the white areas whiter while preserving as much of the original waveform of the halftone characteristics M as possible to retain the function of correcting the reading characteristics of the image-reading unit 10 with the scanning gamma correction unit 112.

As shown in FIG. 4($e$)-FIG. 4($f$), characteristics "density+1," density+2, and "density+3" are set for density adjustment values at each step in the darker direction from the default reference density.

As shown in FIG. 4($e$), the gamma characteristics for "density+1" are set by shifting the black inflection point Q of the reference gamma characteristics to a higher value Q' along the horizontal axis, setting a point S a distance from the black inflection point Q along the halftone characteristics M, and replacing the section of the halftone characteristics M from the point S to the black region A2 side with a curve connecting the shifted inflection point Q' with the point S. The amount that the black inflection point Q is shifted to the new black inflection point Q' along the horizontal axis and the amount that the point S is shifted from the black inflection point Q along the halftone characteristics M are determined dependent on the amount of density adjustment from the reference density.

The characteristics for "density+1" are the same as the reference gamma characteristics in the section of the waveform at which the input value is greater than or equal to the input value corresponding to the point S, and differs only in the section of the waveform having a smaller input value than that corresponding to the point S. The waveform is made different from that of the reference gamma characteristics by increasing the black region A2 and reducing the output values corresponding to input values at the end of the halftone characteristics M near the black region.

Therefore, gamma correction performed with the "density+1" characteristics is the same as that performed with the reference density for the halftone portions and white portions of the original document, but makes black portions and near-black portions of the document more black than gamma correction with the reference density. Accordingly, when adjusting the density in the darker direction, it is possible to make black areas, such as text areas of the original, darker without adversely affecting gamma correction of the scanned data. In other words, black areas can be made more vividly black while appropriately correcting gradations in halftone areas of the original.

Next will be described, with reference to FIG. 5($c$), a comparative method of changing gamma characteristics from the reference gamma characteristics in the darker direction.

In the comparative method, the black inflection point Q is shifted to a higher value Q'. The entire part of the waveform of the halftone characteristics M, indicated by a solid line in the drawing, is changed so that the shifted position Q' connects with the fixed white inflection point P as indicated by a one-dot-and-one-chain line in FIG. 5($c$).

In this case, the characteristics near the white inflection point P also change so that the output values will rapidly decrease with respect to the input values near the white inflection point P. Hence, even if the user only wishes to adjust the density so that only the black areas of the image become more black, all the halftone regions of the image will also be corrected to be more black, and the contours of the white regions will become more pronounced, producing an image with an overall strong contrast.

Gamma characteristics for "density+2" and "density+3" are modified from the reference gamma characteristics according to the same concept used to modify the gamma characteristics for "density+1."

More specifically, as shown in FIGS. 4(f) and 4(g), as the amount of density adjustment increases, the black inflection point Q is shifted farther toward a higher value and the point S is shifted farther from the black inflection point Q. In the case of "density+3," the position of the point S is equivalent to the white inflection point P.

In this way, also for "density+2" and "density+3", the amount that the black inflection point Q is shifted to the new black inflection point Q' along the horizontal axis and the amount that the point S is shifted from the black inflection point Q along the halftone characteristics M are determined dependent on the amount of density adjustment from the reference density.

Figure 5B:
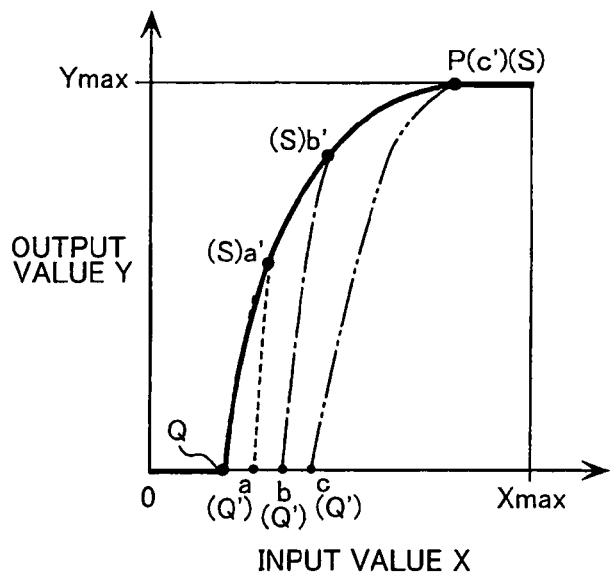
FIG. 5(b) is a graph showing how to change gamma characteristics in the normal copy mode when the density is adjusted in the darker direction.

As shown in FIG. 5(b), gamma characteristics for "density+1" through "density+3" increase only the black region A2 from the reference gamma characteristics (indicated by a solid line in FIG. 5(b)) as the amount of density adjustment from the reference density increases, and changes the waveform of the section of the halftone characteristics M in the halftone region A3 near the black region to have a greater slope as the amount of density adjustment from the reference density increases.

More specifically, the black inflection point Q is shifted along the horizontal axis to higher values at positions a, b, and c (Q') as the amount of density adjustment increases, and points a', b', and c' (S) corresponding to the respective shifted positions a, b, and c of the black inflection point Q are provided on the halftone characteristics M. In this way, the reference gamma characteristics are modified so that the shifted position of the black inflection point Q is connected to a corresponding point on the halftone characteristics M. In other words, the reference gamma characteristics are modified to connect points a-a', b-b', and c-c'. In this case, positions a', b', and c' on the halftone characteristics M corresponding to positions a, b, and c, to which the black inflection point Q is shifted, are set to satisfy expressions Xa<Xa', Xb<Xb', and Xc<Xc'. Hence, as the density adjustment value increases, the slope of the section of the waveform for the halftone characteristics M near the black region is increased, while retaining as much of the waveform of the reference gamma characteristics as possible.

Figure 5C:
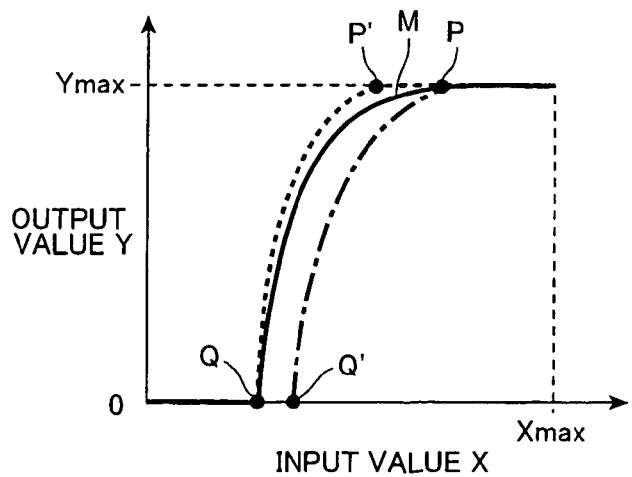
FIG. 5(c) is a graph illustrating a comparative method of changing gamma characteristics according to a density adjustment value in the normal copy mode.

When the black inflection point Q is shifted to positions a and b at higher values as the amount of density adjustment increases, if the entire waveform of the halftone characteristics M were changed to connect the shifted positions a and b to the white inflection point P, as indicated by the one-dot-and-one-chain line in FIG. 5(c), then the waveform of the halftone characteristics M near the white inflection point P will also change so that output values are decreased rapidly with respect to input values. Hence, even if it is desirable to adjust the density to make only black regions of the image darker, all of the halftone regions of the image will also be made darker, producing an overall dark image.

However, in the preferred embodiment, as the amount of density adjustment increases through +1 to +2, the black region A2 is expanded and only a section of the halftone characteristics M waveform near the black region is modified, thereby adjusting the density so that only black regions are made darker.

Here, the position of the point S on the halftone characteristics M is moved upward as the black inflection point Q is shifted higher for the same reason the position of the point R on the halftone characteristics M is moved downward as the white inflection point P is shifted lower in FIG. 5(a).

Specifically, if the point S on the halftone characteristics M were fixed, the slope of the curve connecting the point S on the halftone characteristics M to the shifted position Q' of the black inflection point Q would become too great, making the section of the waveform between the positions S and Q' differ too much from the original waveform of the halftone characteristics M and result in a too much pronounced contrast in the black areas. The present embodiment prevents this by shifting the point S or the halftone characteristics M upward to retain as much of the original waveform as possible. Accordingly, the rate of change in the slope of the section connecting points Q' and S gradually increases from point Q' to point S. That is, the rate of change in the slope of the section connecting points a and a' gradually increases from point a to point a', the rate of change in the slope of the section connecting points b and b' gradually increases from point b to point b', and the rate of change in the slope of the section connecting points c and c' gradually increases from point c to point c'.

In the embodiment described above, the density is adjusted from the reference density in three steps for both the lighter and darker directions, but may be set to any desired number of steps. Further, in the embodiment described above, the positions of points R and S on the halftone characteristics M for "density−3" and "density+3" are set equivalent to the black inflection point Q and white inflection point P, respectively, resulting in the entire waveform of the halftone characteristics M becoming different from the halftone characteristics M of the reference gamma characteristics. However, it is unnecessary to greatly modify the white region A1 and black region A2 in this way. In other words, the shifted amounts of the white inflection point P and black inflection point Q corresponding to the amount of density adjustment may be reduced for the "density−3" and "density+3" in order that the points R and S are provided on the halftone characteristics M.

Next will be described, with reference to FIG. 6(a)-FIG. 6(g), gamma characteristics that the scanning gamma correction unit 112 uses in the gamma correction process for the highlight/shadow washed-out-appearance correcting copy mode.

FIG. 6(a) shows a graph of the reference gamma characteristics. FIG. 6(b)-FIG. 6(d) show the gamma characteristics corresponding to density adjustment values for the copy image adjusted in steps toward the lighter direction. FIG. 6(e)-FIG. 6(g) show graphs of gamma characteristics corresponding to density adjustment values for the copy image adjusted in steps toward the darker direction.

More specifically, the gamma characteristics in FIG. 6(a)-FIG. 6(g) correspond to the gamma characteristics in FIG. 4(a) FIG. 4(g), respectively. The reference gamma characteristics of FIG. 6(a) have a waveform identical to the reference gamma characteristics of FIG. 4(a). However, gamma characteristics for FIG. 6(b)-FIG. 6(g) have different waveforms from the gamma characteristics for FIG. 4(b)-FIG. 4(g). In FIG. 6(b)-FIG. 6(g), the waveform of the reference gamma characteristics is indicated by a dotted line.

As shown in FIG. 6(b), gamma characteristics for "density−1" in the highlight/shadow washed-out-appearance correcting copy mode are configured by shifting the black inflection point Q in the reference gamma characteristics to a lower value Q' along the horizontal axis, setting a point S at a distance from the black inflection point Q along the halftone characteristics M, and replacing the section of the halftone characteristics M from the point S toward the black region A2 side with a curve connecting the shifted inflection point Q' with the point S. The amount that the black inflection point Q is shifted to the new black inflection point Q' along the horizontal axis and the amount that the point S is shifted from the black inflection point Q along the halftone characteristics M are determined dependent on the amount of density adjustment from the reference density.

In "density−1" for the highlight/shadow washed-out-appearance correcting copy mode, the waveform of the gamma characteristics for input values greater than or equal to the input value corresponding to the point S are the same as the reference gamma characteristics, but the section of the waveform having smaller input values than that corresponding to the point S is different. This section is made different from the reference gamma characteristics by decreasing the black region A2 and increasing the output values corresponding to input values at the end of the halftone characteristics M near the black region.

Hence, for the halftone and white portions of the original, gamma correction using the gamma characteristics in "density−1" is performed the same as that with the reference density. However, for black portions and near-black portions of the original, gamma correction using the gamma characteristics in "density−1" restrains the black slightly more than that with the reference density.

Accordingly, it is possible to prevent dark colors from erroneously becoming black, without adversely affecting gamma correction of the scanned data. More specifically, when copying originals having text or graphics in dark colors such as blue on a dark background, it is possible to effectively restrain areas of the text or graphics from being converted to black color similar to the ground color. It is therefore possible to prevent the dark text or graphics from appearing washed out and lost in the black shadow background portion.

Gamma characteristics for "density−2" and "density−3" are produced by modifying the reference gamma characteristics according to the same concept used for gamma characteristics of "density−1."

More specifically, as shown in FIGS. 6(c) and 6(d), as the amount of density adjustment increases, the black inflection point Q is shifted farther toward a lower value, and the point S is shifted farther from the black inflection point Q. In the case of "density−3," the point S is set equivalent to the white inflection point P.

In this way, also for "density−2" and "density−3", the amount that the black inflection point Q is shifted to the new black inflection point Q' along the horizontal axis and the amount that the point S is shifted from the black inflection point Q along the halftone characteristics M are determined dependent on the amount of density adjustment from the reference density.

Figure 7B:
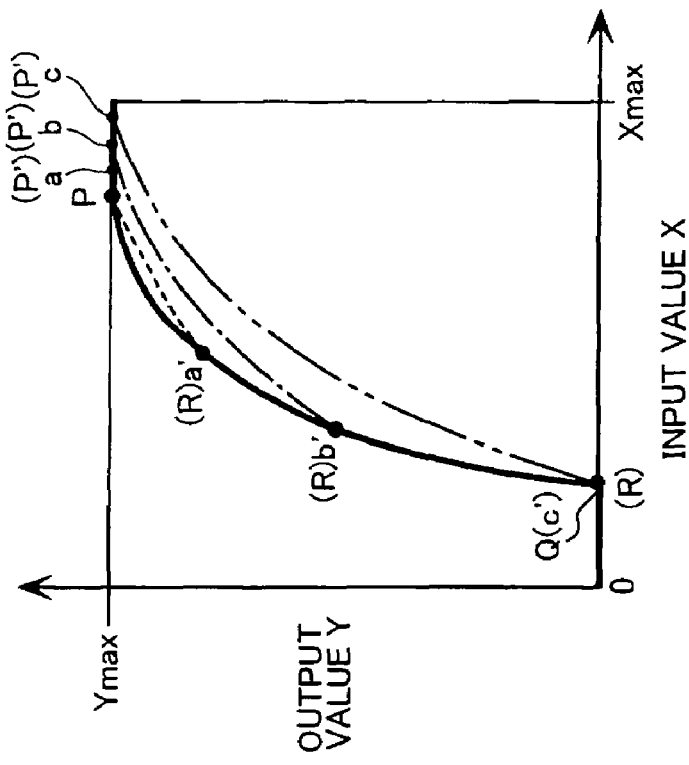
FIG. 7(b) is a graph showing how to change gamma characteristics in the highlight/shadow washed-out-appearance correcting copy mode when the density is adjusted in the darker direction.
Figure 7A:
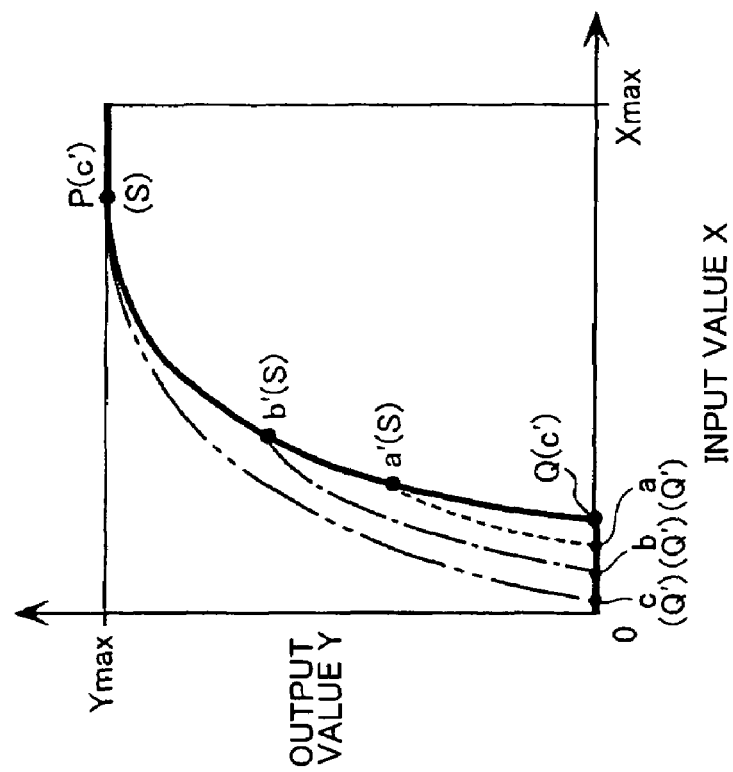
FIG. 7(a) is a graph showing how to change gamma characteristics in the highlight/shadow washed-out-appearance correcting copy mode when the density is adjusted in the lighter direction.

As shown in FIG. 7(a), the gamma characteristics of "density−1" through "density−3" reduces only the black region A2 from the reference gamma characteristics (indicated by a solid line in the drawing) as the amount of density adjustment increases, and changes the waveform in the halftone region A3 for the section of the halftone characteristics M rear the black region to have a lesser slope as the amount of density adjustment increases. Gamma characteristics are changed according to the density adjustment value in the highlight/shadow washed-out-appearance correcting copy mode according to the same concept used in the normal copy mode. That is, only part of the waveform for the halftone characteristics M is changed according to the density adjustment value, while retaining as much of the original waveform for the reference gamma characteristics as possible. More specifically, as the density adjustment value increases, the waveform in a partial section of the halftone characteristics M near the black region is modified to have a lesser slope.

Specifically, as the amount of density adjustment increases from the reference density, the black inflection point Q is shifted along the horizontal axis to a lower value at positions a, b, and c (Q'), and points a', b', and c' (S) corresponding to the respective shifted positions a, b, and c of the black inflection point Q are provided on the halftone characteristics M. In this way, the reference gamma characteristics are modified to connect the shifted position of the black inflection point Q to the point on the halftone characteristics M corresponding to the shifted position, that is, to connect points a-a', b-b', and c-c'. The positions a', b', and c' on the halftone characteristics M corresponding to the sequentially shifted position of the black inflection point Q are set to satisfy the expressions Xa<Xa', Xb<Xb', and Xc<Xc'.

As the amount of density adjustment from the reference density increases in the highlight/shadow washed-out-appearance correcting copy mode, the black region A2 is contracted and only a section of the halftone characteristics M on the black region side is modified. It is possible to restrain dark colors from being converted into black by making small the amount of the black region A2.

The position of the point S on the halftone characteristics M corresponding to the shifted position Q' of the black inflection point Q is shifted upward as the shifted black inflection point Q' is moved to a lower value for the same reason that the position of the point S on the halftone characteristics M is shifted upward as the shifted black inflection point Q' is moved to a higher value in FIG. 5(b).

In FIG. 6(e), gamma characteristics for "density+1" are configured by shifting the white inflection point P in the reference gamma characteristics to a higher value P' in a direction parallel to the horizontal axis, setting a point R on the halftone characteristics M that is shifted a distance from the white inflection point P along the halftone characteristics M, and replacing the section of the halftone characteristics M from the point R toward the white region A1 side with a curve connecting the shifted white inflection point P' to the point R. The amount that the white inflection point P is shifted to the shifted point P' in a direction parallel to the horizontal axis and the amount that the point R is moved from the white inflection point P along the halftone characteristics M are determined dependent on the amount of density adjustment from the reference density.

In gamma characteristics for "density+1," the waveform in the region having input values less than or equal to the input value corresponding to the point R is identical to that of the reference gamma characteristics, while the waveform in the region in which the input values are greater than that corresponding to the point R is different. The waveform is made different from the reference gamma characteristics by contracting the white region A1 and reducing the output values corresponding to input values on the end of the halftone characteristics M near the white region.

Hence, gamma correction for "density+1" is performed the same as for the reference density in the halftone and black areas of the original, but restrains the white slightly more than that of the reference density in white and near-white areas of the original. In this way, when adjusting the density in the darker direction, it is possible to prevent light areas from appearing washed out and lost in white background in the copied image without having adverse effects on gamma correction of the scanned data. For example, when copying original documents having text or graphics in light colors such as yellow on a white background, it is possible to effectively prevent regions of light text and light graphics from being converted to white and washed out or lost in the white ground.

Gamma characteristics for "density+2" and "density−3" are generated by modifying the reference gamma characteristics according to the same concept as that used for gamma characteristics for "density+1."

More specifically, as shown in FIG. 6(f) and FIG. 6(g), as the amount of density adjustment increases, the white inflection point P is shifted farther toward a higher value and the point R is shifted farther from the white inflection point P. In the case of "density+3," the position of the point R is set equivalent to the black inflection point Q.

In this way, also for "density+2" and "density+3", the amount that the white inflection point P is shifted to the shifted point P' in a direction parallel to the horizontal axis and the amount that the point R is moved from the white inflection point P along the halftone characteristics M are determined dependent on the amount of density adjustment from the reference density.

As shown in FIG. 7(b), gamma characteristics for "density+1" through "density+3" reduce only the white region A1 from the reference gamma characteristics (indicated by a solid line in the drawing) as the amount of density adjustment from the reference density increases. Further, the waveform in the halftone region A3 for a partial section of the halftone characteristics M near the white region is modified to have a lesser slope as the amount of density adjustment increases.

Specifically, the white inflection point P is shifted in a direction parallel to the horizontal axis to higher values at positions a, b, and c (P') as the amount of density adjustment from the reference density increases. Further, points a', b', and c' (R) corresponding to the shifted positions a, b, and c of the white inflection point P are provided on the halftone characteristics M. The reference gamma characteristics are modified to connect the shifted position of the white inflection point P with the point on the halftone characteristics M corresponding to the shifted position, that is, to connect points a-a', b-b', and c-c'. Positions a', b', and c' or the halftone characteristics M corresponding to sequentially shifted positions a, b, and c are set to satisfy the expressions Xa'<Xa, Xb'<Xb, and Xc'<Xc. In this case, the waveform for the partial section of the halftone characteristics M near the white region is modified to have a lesser slope as the density adjustment value increases, while retaining as much of the waveform for the halftone characteristics M of the reference gamma characteristics as possible.

In the highlight/shadow washed-out-appearance correcting copy mode, the white region A1 is contracted as the amount of density adjustment increases, and only the waveform of the halftone characteristics M in the section near the white region is modified. It is possible to restrain light colors from being converted into white by making small the amount of the white region A1.

Here, the position of the point R on the halftone characteristics M corresponding to the shifted position P' of the white inflection point P is moved downward as the shifted position P' of the white inflection point P is shifted to a higher value for the same reason that the position of the point R on the halftone characteristics M corresponding to the shifted position P' of the white inflection point P in FIG. 5(a) is moved downward as the shifted position P' of the white inflection point P is shifted to a lower value.

Next will be described, with reference to FIG. 8(a)-FIG. 8(g), gamma characteristics that the scanning gamma correction unit 112 uses to perform gamma correction in the photograph copy mode.

FIG. 8(a) indicates the reference gamma characteristics. FIG. 8(b)-FIG. 8(d) show gamma characteristics corresponding to density adjustment values for copied images as the density is adjusted in steps in the lighter direction. FIG. 8(e)-FIG. 8(g) shows gamma characteristics corresponding to density adjustment values for copied images as the density is adjusted in steps in the darker direction, The gamma characteristics shown in FIG. 8(a)-FIG. 8(g) correspond to those in FIG. 4(a)-FIG. 4(g). The reference gamma characteristics in FIG. 6(a) have a waveform identical to that of the reference gamma characteristics in FIG. 4(a). However, the gamma characteristics in FIG. 8(b)-FIG. 8(g) have different waveforms than those of the corresponding gamma characteristics in FIG. 4(b)-FIG. 4(g).

As shown in FIG. 8(b), gamma characteristics for "density−1" in the photograph copy mode are configured by shifting the white inflection point P in the reference gamma characteristics to a lower value P' along a line parallel to the horizontal axis, and shifting the black inflection point Q to a lower value Q' along the horizontal axis. Further, a point R is set on the halftone characteristics M a distance from the white inflection point P along the halftone characteristics M, and a point S is set on the halftone characteristics M a distance from the black inflection point Q along the halftone characteristics M. The section of the halftone characteristics M from the point R toward the white region A1 side is replaced by a curve connecting the shifted inflection point P' with the point R, and the section of the halftone characteristics M from the point S toward the black region A2 side is replaced by a curve connecting the shifted inflection point Q' with the point S.

The shifted amount of the white inflection point P to the shifted point P' parallel to the horizontal axis, the shifted amount of the black inflection point Q to the shifted point Q' along the horizontal axis, the amount that the point R is moved from the white inflection point P along the halftone characteristics M, and the amount that the point S is moved from the black inflection point Q along the halftone characteristics M are determined dependent on the amount of density adjustment from the reference density. It is noted that the shifted amount of the white inflection point P to the shifted point P' and the shifted amount of the black inflection point Q to the shifted point Q' may be equal to or different from each other. Similarly, the shifted amount of the point R from the point P and the shifted amount of the point S from the point Q may be equal to or different from each other.

Gamma characteristics for "density−1" in the photograph copy mode are generated by modifying the waveform of the reference gamma characteristics to include waveform modifications near the white region and waveform modifications near the black region, as described according to FIGS. 5(a) and 7(a).

Since the white region A1 increases and the black region A2 decreases in the gamma characteristics of "density−1" for the photograph copy mode, the halftone region A3 is shifted lower on the horizontal axis. Hence, the halftone region A3 is broader than that in the gamma characteristics of "density−1" for the normal copy mode (see FIG. 4(b)), and the section of the halftone characteristics M near the black region (characteristics connecting point S to the shifted inflection point Q') has a gentler slope. Accordingly, black spots and other noise can be prevented from being generated in the white areas, while maintaining appropriate gradations in the halftone areas of the photographic document.

Gamma characteristics for "density−2" and "density−3" in the photograph copy mode are produced by modifying the reference gamma characteristics according to the same concept used for the gamma characteristics of "density−1."

More specifically, as shown in FIGS. 8(c) and 8(d), as the amount of density adjustment increases, the amounts that the white inflection point P and black inflection point Q are shifted to lower values increases and the amounts that the point R is moved away from the white inflection point P and the point S from the black inflection point Q increase. In the case of "density−3," the position of the point R is set equivalent to the point S.

In this way, also for "density−2" and "density−3", the shifted amount of the white inflection point P to the shifted point P' parallel to the horizontal axis, the shifted amount of the black inflection point Q to the shifted point Q' along the horizontal axis, the amount that the point R is moved from the white inflection point P along the halftone characteristics M, and the amount that the point S is moved from the black inflection point Q along the halftone characteristics M are determined dependent on the amount of density adjustment from the reference density.

It is noted that the shifted amount of the white inflection point P to the shifted point P' and the shifted amount of the black inflection point Q to the shifted point Q' may be equal to or different from each other. Similarly, the shifted amount of the point R from the point P and the shifted amount of the point S from the point Q may be equal to or different from each other.

The gamma characteristics for "density−2" and "density−3" in the photograph copy mode can make white areas whiter, while appropriately maintaining the gradations in halftone areas of a photographic document.

On the other hand, gamma characteristics for "density+1" in the photograph copy mode shown in FIG. 8(e) are configured by shifting the white inflection point P in the reference gamma characteristics to a higher value along a line parallel to the horizontal axis and shifting the black inflection point Q to a higher value along the horizontal axis. Further, a point R is set on the halftone characteristics M a distance from the white inflection point P along the halftone characteristics M, and a point S is set on the halftone characteristics M a distance from the black inflection point Q along the halftone characteristics M. The section of the halftone characteristics M from the point R toward the white region A1 side is replaced by a curve connecting a shifted inflection point P' and the point R, while the section of the halftone characteristics M from the point S toward the black region A2 is replaced by a curve connecting a shifted inflection point Q' to the point S.

The amount in which the white inflection point P is shifted to the point P' parallel to the horizontal axis, the amount in which the black inflection point Q is shifted to the point Q' along the horizontal axis, the distance of the point R from the white inflection point P along the halftone characteristics M, and the distance of the point S from the black inflection point Q along the halftone characteristics M are determined dependent on the amount of density adjustment from the reference density. It is noted that the shifted amount of the white inflection point P to the shifted point P' and the shifted amount of the black inflection point Q to the shifted point Q' may be equal to or different from each other. Similarly, the shifted amount of the point R from the point P and the shifted amount of the point S from the point Q may be equal to or different from each other.

As with the gamma characteristics for "density−1" in the photograph copy mode, the gamma characteristics for "density+1" are produced by modifying the waveform of the reference gamma characteristics to include waveform modifications in the white region and waveform modifications in the black region. In this case, the white region A1 is contracted, but the black region A2 is expanded, unlike the case of "density−1."

Since the gamma characteristics for "density+1" in the photograph copy mode contract the white region A1 and expand the black region A2, the halftone region A3 is shifted higher on the horizontal axis. Hence, the halftone region A3 is made broader than in the gamma characteristics for "density+1" in the normal copy mode (see FIG. 4(e)) and the section of the halftone characteristics M near the white region (the characteristics connecting the point R to the inflection point P') has a more gradual slope. Accordingly, black areas car be made more vividly black while retaining appropriate gradations for halftone areas of the photographic document.

Gamma characteristics for "density+2" and "density+3" in the photograph copy mode are produced by modifying the reference gamma characteristics according to the same concept used for the gamma characteristics of "density+1."

More specifically, as shown in FIG. 8(f) and FIG. 8(g), as the amount of density adjustment increases, the white inflection point P and black inflection point Q are shifted more toward the higher value side, the point R is moved farther from the white inflection point P, and the point S is moved farther from the black inflection point Q. In the case of "density+3," the position of the point R overlaps the position of the point S.

In this way, also for "density+2" and "density+3", the amount in which the white inflection point P is shifted to the point P' parallel to the horizontal axis, the amount in which the black inflection point Q is shifted to the point Q' along the horizontal axis, the distance of the point R from the white inflection point P along the halftone characteristics M, and the distance of the point S from the black inflection point Q along the halftone characteristics M are determined dependent on the amount of density adjustment from the reference density.

It is noted that the shifted amount of the white inflection point P to the shifted point P' and the shifted amount of the black inflection point Q to the shifted point Q' may be equal to or different from each other. Similarly, the shifted amount of the point R from the point P and the shifted amount of the point S from the point Q may be equal to or different from each other.

Gamma characteristics for "density+2" and "density+3" in the photograph copy mode can adjust densities to make black areas of an image darker, while maintaining appropriate gradations in the halftone areas of a photographic document.

Next will be described, with reference to FIG. 10(b), a process performed by the controller 13 when the density for copied images is adjusted, and will be described, with reference to FIG. 11, a copy operation executed by tire image-processing unit 11 after density adjustments.

FIG. 10(b)-i a flowchart showing steps in the process performed by the controller 13 when the density for copied images is adjusted. The steps in the flowchart indicate the process when the density adjustment screen of FIG. 2 is being displayed on the display 2.

After the density adjustment screen (see FIG. 2) is started being displayed on the display 2, the controller 13 determines in S1 whether the user has operated either of the left/right keys 331c and 331d on the directional key 331. If the directional key 331 has not been operated (S1: NO), then in S3 the controller 13 determines whether or not the menu/set button 332 has been operated. If neither the directional key 331 nor the menu/set button 332 has been operated (S1, S3: NO), then the controller 13 loops between S1 and S3 in a wait state until one of the buttons has been operated.

If the controller 13 determines that either of the left/right keys 331c and 331d has been operated (S1: YES), then in S2 the controller 13 shifts the density adjustment value highlighted in the density adjustment screen one step in the direction indicated by the operated key. For example, if the left key 331c has been operated while the density adjustment screen appears as shown in FIG. 2, then the highlighted mark is shifted from the center density adjustment mark 8a to the mark 8c left of the center density adjustment mark 8a. However, if the right key 331d has been operated, then the highlighted mark is shifted from the center density adjustment mark 8a to the mark 8b directly to the right of the center density adjustment mark 8a.

Next, the controller 13 determines in S3 whether the menu/set button 332 has been operated. If the menu/set button 332 has not been operated (S3: NO), then the controller 13 returns to S1 to determine whether the directional key 331 has been operated again. If the user continually operates the directional key 331 while the controller 13 loops between steps S1 and S3, in S2 the controller 13 continues to shift the density adjustment value highlighted in the density adjustment screen one step in the direction of the operated button for each operation.

When the user operates the menu/set button 332 (S3: YES), indicating that the mark highlighted in the density adjustment screen is the user's desired density value for copied images, then in S4 the controller 13 sets the density value for copied images to this highlighted density adjustment value. For example, if the user operates the menu/set button 332 while the mark 8b two places to the right of the center density adjustment mark 8a is highlighted, then the controller 13 changes the density value two steps darker than the reference density, that is, density (+2).

In S5 the controller 13 returns the display screen 2a to a standby screen.

In S6 the controller 13 determines the presently-set copy mode.

If the controller 13 determines that the copy mode is the normal copy mode (S6: Normal), then in S7 the controller 13 sets one set of gamma characteristics that corresponds to the presently-set density adjustment value and that corresponds to the normal copy mode. In other words, the controller 13 selects one set of gamma characteristics that corresponds to the density adjustment value from the gamma characteristics shown in FIG. 4(a)-FIG. 4(g).

If the controller 13 determines in S6 that the copy mode is the highlight/shadow washed-out-appearance correcting copy mode (S6; Highlight/shadow washed-out-appearance correction), then in S8 the controller 13 sets one set of gamma characteristics that corresponds to the presently-set density adjustment value and that corresponds to the highlight/shadow washed-out-appearance correcting copy mode. In other words, the controller 13 selects one set of gamma characteristics that corresponds to the density adjustment value from among the gamma characteristics shown in FIG. 6(a)-FIG. 6(g).

Further, if the controller 13 determines that the copy mode is the photograph copy mode (S6: Photograph), then in S9 the controller 13 sets one set of gamma characteristics that corresponds to the density adjustment value and that corresponds to the photograph copy mode. In other words, the controller 13 selects one set of gamma characteristics that corresponds to the density adjustment value from the gamma characteristics shown in FIG. 8(a)-FIG. 8(g).

In S10 the controller 13 outputs data for the selected gamma characteristics to the scanning gamma correction unit 112 and sets the gamma characteristics corresponding to the user's set density adjustment value in the reading gamma correction unit 112. Subsequently, the density adjustment process ends.

Figure 11:
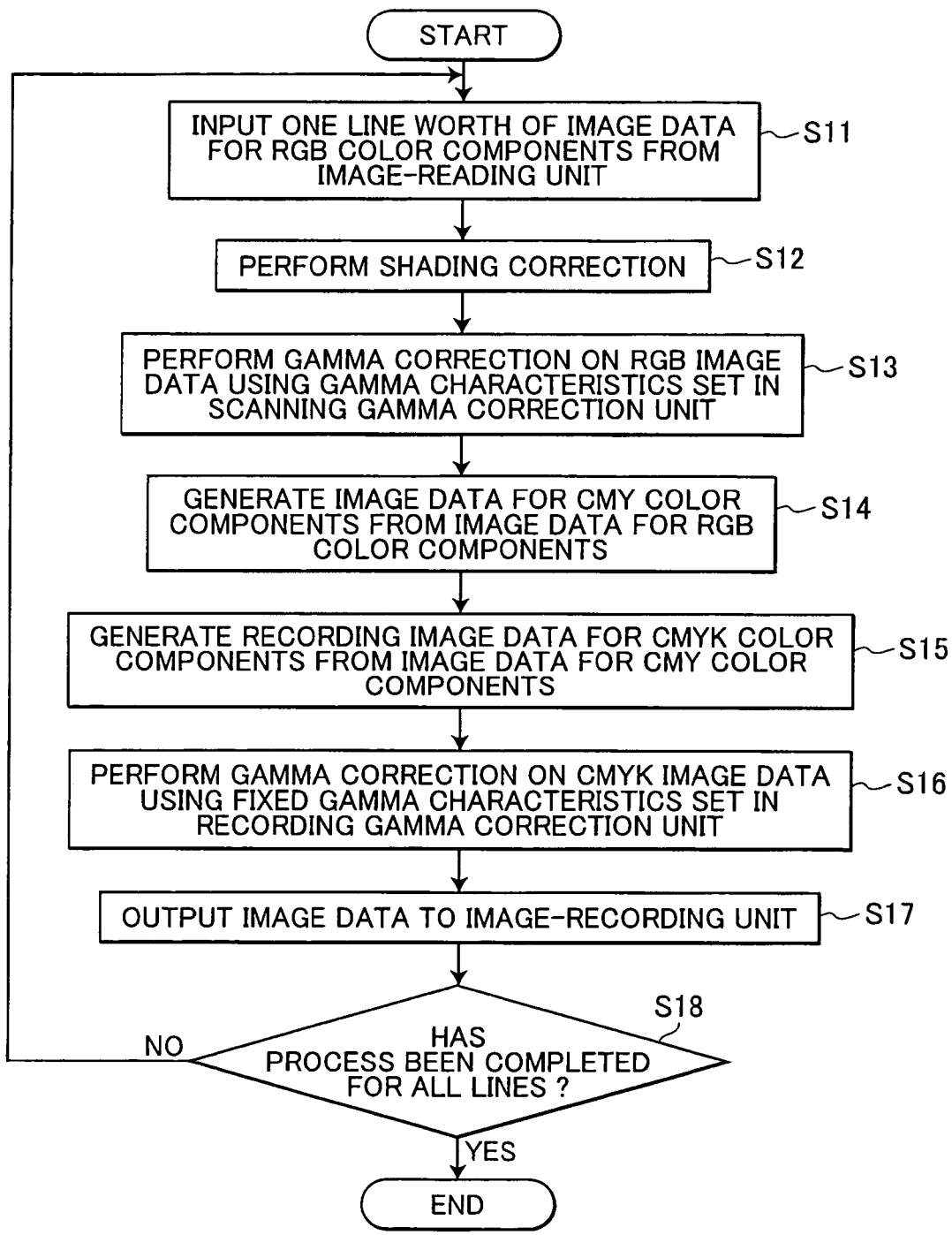
FIG. 11 is a flowchart showing steps in a copy operation performed by an image-processing unit in the multifunction device.

FIG. 11 is a flowchart showing steps in a copy operation performed by the image-processing unit 11 after the density for copied images has been set and a corresponding set of gamma characteristics has been set in the scanning gamma correction unit 112 as described above with reference to FIG. 10(b).

After reading an image from an original document, first, in S11, the image-reading unit 10 outputs image data for the RGB color components for one line of the image into the image-processing unit 11.

In S12 the shading correction unit 111 in the image-processing unit 11 performs shading correction on the image data for each color component.

In S13 the scanning gamma correction unit 112 performs gamma correction on the image data for the RGB color components using gamma characteristics that has been set in the process of FIG. 10(b) in correspondence with the presently-set density adjustment value and with the presently-set copy mode.

In S14 the color conversion unit 113 generates image data for the CMY color components using the gamma-corrected image data for the RGB color components.

In S15 the UCR process unit 114 generates recording image data for the CMYK color components from the image data generated by the color conversion unit 113.

In S16 the recording gamma correction unit 115 performs gamma correction on this recording image data for the CMYK color components.

In S17 the image-processing unit 11 outputs the gamma corrected CMYK image data to the image-recording unit 12, and the image-recording unit 12 forms one lire worth of an image on recording paper.

In S18 the image-processing unit 11 determines whether the image process has been completed for all lines of image data.

If the image process has not been completed for all lines (S18: NO), then the image-processing unit 11 returns to S11 and repeats the image process described above (S11-S17) for the next line of image data. In this way, recording image data for the CMYK color components is generated in units of lines, and the image-recording unit 12 forms an image on the recording paper based on the image data.

When all lines of the image data have been formed (S18: YES), the image forming process ends.

In the multifunction device 1 according to the preferred embodiment described above, the scanning gamma correction unit 112 performs gamma correction to adjust the density of image data using gamma characteristics that have been modified according to a density adjustment value.

During the normal copy mode, the reference gamma characteristics are modified by expanding the white region A1 or black region A2 based on an amount of density adjustment and the direction of this adjustment from the reference density, and the waveform making up a portion of the halftone characteristics M near the white region or the black region is modified according to the amount of density adjustment. Accordingly, the multifunction device 1 of the preferred embodiment can appropriately correct the density of an image by making only white areas whiter or black areas blacker without changing the image to unnatural gradations.

During the highlight/shadow washed-out-appearance correcting copy mode, the multifunction device 1 contracts the white region A1 or black region A2 with respect to the reference gamma characteristics in the direction of density adjustment from the reference density and according to the amount of density adjustment, and modifies the waveform making up a section of the halftone characteristics M near the white region or black region according to the amount of density adjustment. Accordingly, when copying an original document having dark text or graphics on a black background, the multifunction device 1 can produce a copied image in a suitable density by preventing the dark areas from appearing washed out in the black background. When copying an original document having light text or graphics on a white background, the multifunction device 1 can produce a copied image in a suitable density by preventing the light areas from appearing washed out in the white background.

During the photograph copy mode, the multifunction device 1 shifts the white region A1 and black region A2 in the reference gamma characteristics according to the amount of density adjustment toward either the higher direction or lower direction of input levels according to the direction of the density adjustment from the reference density, and modifies the waveform making up sections of the halftone characteristics M near the white region and the black region according to the amount of density adjustment. Accordingly, the multifunction device 1 can appropriately adjust the density to make only white regions whiter or black regions blacker while retaining the gradations in the photographic original.

While the invention has been described in detail with reference to the specific embodiment thereof, it would be apparent to those skilled in the art that various changes and modifications may be made therein without departing from the spirit of the invention.

For example, in the preferred embodiment described above, the gamma characteristics is defined as a curve in which the output value increases monotonously as the input value increases. However, the gamma characteristics may have the opposite property, that is, gamma characteristics may be defined by a curve in which the output value declines monotonously as the input value increases.

The above-described embodiment relates to a copier function of a multifunction device, but may be modified to a wide range of devices that adjust the density of an image by performing gamma correction on image data. Further, the preferred embodiment relates to gamma correction of color images, but may be modified to perform gamma correction on monochrome images.

The multifunction device 1 of the preferred embodiment described above may be employed in numerous ways. For example, an external computer may be connected to the multifunction device 1 and may transmit image data for RGB color components or monochrome image data to the multifunction device 1, wherein the scanning gamma correction unit 112 performs gamma correction onto the image data based on the density adjustment value and the image-recording unit 12 forms images based on this gamma-corrected image data on recording paper.

Alternatively, an external digital camera may be connected to the multifunction device 1 and may transmit image data for RGB color components or monochrome image data taken by the digital camera to the multifunction device 1, wherein the scanning gamma correction unit 112 performs gamma correction onto the image data based on the density adjustment value and the image-recording unit 12 forms images based on this gamma-corrected image data on recording paper.

In the above description, the black inflection points Q in the reference gamma characteristics of FIG. 4(a), FIG. 6(a), and FIG. 8(a) are equal to one another, and the white inflection points P in the reference gamma characteristics of FIG. 4(a), FIG. 6(a), and FIG. 8(a) are equal to one another. However, the black inflection points Q in the reference gamma characteristics of FIG. 4(a), FIG. 6(a), and FIG. 8(a) may be different from one another, and the white inflection points P in the reference gamma characteristics of FIG. 4(a), FIG. 6(a), and FIG. 8(a) may be different from one another. In this case, the gamma characteristics memory 13a is prestored with the reference gamma characteristics of FIG. 6(a) and FIG. 8(a) in addition to the reference gamma characteristics of FIG. 4(a) and the gamma characteristics of FIGS. 4(b)-4(b), 6(b)-6(g), and 8(b)-8(g).

For example, the black inflection points Q in FIG. 8(a) may be modified to be lower than the black inflection point Q in FIG. 4(a), and the white inflection point P in FIG. 8(a) may be modified to be higher than the white inflection point P in FIG. 4(a). This is because the reproduction characteristics for multilevel images, such as photographs and graphics desirably should have smaller amounts of the white and black regions and larger amount of the halftone region than those for the binary images, such as texts.

FIG. 12 shows desirable reproduction characteristics for multilevel images, such as photographs, indicated by a one-dot-and-one-chain line and desirable reproduction characteristics for binary images, such as text, indicated by a solid line. The black inflection point Qm for multilevel images is lower than the black inflection point Qb for binary images, while the white inflection point Pm for multilevel images is higher than the white inflection point Pb for binary images.

Accordingly, the points P and Q in FIGS. 8(a)-8(g) should be modified to the points Pm and Qm shown in FIG. 12. In this case, the positions of the points P', Q', R, and S in FIGS. 8(b)-8(g) are also modified with respect to the modified positions Pm and Qm and on the corresponding density adjustment value.

Similarly, the points v and Q in FIGS. 4(a)-4(g) should be modified to the points Pb and Qb shown in FIG. 12. In this modification, the positions of the points P', Q', R, and S in FIGS. 4(b)-4(g) are modified with respect to the modified positions Pb and Qb and or the corresponding density adjustment value.

What is claimed is:

1. A density-adjusting device, comprising:
a density-adjustment-value setting unit configured to set a density adjustment value, according to which a density of image data is desired to be adjusted with respect to a predetermined reference density value;
a gamma characteristics storing unit that is pre-stored with a set of reference gamma characteristics in correspondence with the reference density value and that is pre-stored with a plurality of sets of non-reference gamma characteristics in correspondence with a plurality of density adjustment values that are configured to be set by the density-adjustment-value setting unit, further wherein each set of non-reference gamma characteristics of the plurality of pre-stored sets of non-reference gamma characteristics corresponds to one density adjustment value; and
a correcting unit configured to correct values of the image data by using one set of non-reference gamma characteristics that corresponds to the density adjustment value set by the density-adjustment-value setting unit, thereby adjusting the density of the image data according to the desired density adjustment value, wherein the set of reference gamma characteristics includes:

a first reference region having first reference characteristics for converting input values to a predetermined maximum output value;

a second reference region having second reference characteristics for converting input values to a predetermined minimum output value; and a third reference region defined between the first and second reference regions and having third reference characteristics for converting input values to intermediate output values defined between the maximum output value and the minimum output value, the third reference characteristics defining a reference monotonous curve that changes monotonously with respect to change in the amount of the input value, and wherein a set of non-reference gamma characteristics that corresponds to each density adjustment value includes:

a first region having first characteristics for converting input values to the maximum output value;

a second region having second characteristics for converting input values to the minimum output value; and a third region defined between the first and second regions and having third characteristics for converting input values to intermediate output values defined between the maximum output value and the minimum output value, the third characteristics defining a monotonous curve that changes monotonously with respect to change in the amount of the input value, wherein the amount of at least one of the first region and the second region being different from the amount of the corresponding at least one of the first reference region and the second reference region by a degree dependent on each density adjustment value, wherein the third characteristics being different from the third reference characteristics in at least a partial range of the third region that is next to the at least one of the first region and the second region, the at least a partial range being determined dependent on each density adjustment value.

2. A density-adjusting device according to claim 1, wherein the set of reference gamma characteristics further includes:

a first reference inflection point corresponding to a point, at which the first reference region connects with the third reference region; and a second reference inflection point corresponding to a point, at which the second reference region connects with the third reference region, and wherein a set of non-reference gamma characteristics for each of at least one density adjustment values further includes:

a first inflection point corresponding to a point, at which the first region connects with the third region;

a second inflection point corresponding to a point, at which the second region connects with the third region, at least one of the first and second inflection points being shifted from corresponding at least one of the first and second reference inflection points by an amount and in a direction that are determined dependent on each density adjustment value;

an additional inflection point located in the third region, the additional inflection point being the same as a point that is located on the reference monotonous curve as being shifted from the at least one of the first and second reference inflection points along the reference monotonous curve by an amount that is determined dependent on each density adjustment value; and a monotonous curve that extends between the additional inflection point and the at least one of the first and second inflection points and that is different from a section of the reference monotonous curve between the point the same as the additional inflection point and the at least one of the first reference inflection point.

3. A density-adjusting device according to claim 2, wherein the amount of the first region in the set of non-reference gamma characteristics is different from the amount of the first reference region by an amount that is determined dependent on the density adjustment value;

wherein the second region in the set of non-reference gamma characteristics is the same as the second reference region;

wherein the first inflection point in the set of non-reference gamma characteristics is shifted from the first reference inflection point by an amount and in a direction that are determined dependent on the density adjustment value;

wherein the second inflection point in the set of non-reference gamma characteristics is the same as the second reference inflection point;

wherein the additional inflection point in the set of non-reference gamma characteristics is the same as a point that is located on the reference monotonous curve as being shifted from the first reference inflection point along the reference monotonous curve by an amount that is determined dependent on the density adjustment value;

wherein the monotonous curve in the set of non-reference gamma characteristics extends between the additional inflection point and the first inflection point and is different from a section of the reference monotonous curve between the point the same as the additional inflection point and the first reference inflection point; and wherein the set of non-reference gamma characteristics further has an additional monotonous curve that extends between the additional inflection point and the second inflection point and that is the same as a section of the reference monotonous curve between the point the same as the additional inflection point and the second reference inflection point.

4. A density-adjusting device according to claim 3, wherein the first region is increased from the first reference region by an amount that is determined dependent on the density adjustment value, with an input value at the first inflection point being smaller than an input value at the first reference inflection point by the amount.

5. A density-adjusting device according to claim 3, wherein the first region is decreased from the first reference region by an amount that is determined dependent on the density adjustment value, with an input value at the first inflection point being greater than an input value at the first reference inflection point by the amount.

6. A density-adjusting device according to claim 2, wherein the first region in the set of non-reference gamma characteristics is the same as the first reference region;

wherein the amount of the second region in the set of non-reference gamma characteristics is different from the amount of the second reference region by an amount that is determined dependent on the density adjustment value;

wherein the first inflection point in the set of non-reference gamma characteristics is the same as the first reference inflection point;

wherein the second inflection point in the set of non-reference gamma characteristics is shifted from the second reference inflection point by an amount and in a direction that are determined dependent on the density adjustment value;

wherein the additional inflection point in the set of non-reference gamma characteristics is the same as a point that is located on the reference monotonous curve as being shifted from the second reference inflection point along the reference monotonous curve by an amount that is determined dependent on the density adjustment value;

wherein the monotonous curve in the set of non-reference gamma characteristics extends between the additional inflection point and the second inflection point and is different from a section of the reference monotonous curve between the point the same as the additional inflection point and the second reference inflection point; and wherein the set of non-reference gamma characteristics further has an additional monotonous curve that extends between the additional inflection point and the first inflection point and that is the same as a section of the reference monotonous curve between the point the same as the additional inflection point and the first reference inflection point.

7. A density-adjusting device according to claim 6, wherein the second region is greater than the second reference region by an amount that is determined dependent on the density adjustment value, with an input value at the second inflection point being greater than an input value at the second reference inflection point by the amount.

8. A density-adjusting device according to claim 6, wherein the second region is smaller than the second reference region by an amount that is determined dependent on the density adjustment value, with an input value at the second inflection point being smaller than an input value at the second reference inflection point by the amount.

9. A density-adjusting device according to claim 2, wherein the amount of the first region in the set of non-reference gamma characteristics is different from the amount of the first reference region by a first amount that is determined dependent on the density adjustment value;

wherein the amount of the second region in the set of non-reference gamma characteristics is different from the amount of the second reference region by a second amount that is determined dependent on the density adjustment value; wherein the first inflection point in the set of non-reference gamma characteristics is shifted from the first reference inflection point by the first amount and in a first direction that are determined dependent on the density adjustment value;

wherein the second inflection point in the set of non-reference gamma characteristics is shifted from the second reference inflection point by the second amount and in a second direction that are determined dependent on the density adjustment value; wherein the additional inflection point in the set of non-reference gamma characteristics includes: a first additional inflection point that is the same as a point that is located on the reference monotonous curve as being shifted from the first reference inflection point along the reference monotonous curve by a third amount that is determined dependent on the density adjustment value; and a second additional inflection point that is the same as a point that is located on the reference monotonous curve as being shifted from the second reference inflection point along the reference monotonous curve by a fourth amount that is determined dependent on the density adjustment value;

wherein the monotonous curve in the set of non-reference gamma characteristics includes: a first monotonous curve that extends between the first additional inflection point and the first inflection point and that is different from a section of the reference monotonous curve between the point the same as the first additional inflection point and the first reference inflection point; and a second monotonous curve that extends between the second additional inflection point and the second inflection point and that is different from a section of the reference monotonous curve between the point the same as the second additional inflection point and the second reference inflection point; and wherein the set of non-reference gamma characteristics further has an additional monotonous curve that extends between the first additional inflection point and the second additional inflection point and that is the same as a section of the reference monotonous curve between the point the same as the first additional inflection point and the point the same as the second additional inflection point.

10. A density-adjusting device according to claim 9, wherein the first region is greater than the first reference region by the first amount that is determined dependent on the density adjustment value, with an input value at the first inflection point being smaller than an input value at the first reference inflection point by the first amount; and wherein the second region is smaller than the second reference region by the second amount that is determined dependent on the density adjustment value, with an input value at the second inflection point being smaller than an input value at the second reference inflection point by the second amount.

11. A density-adjusting device according to claim 9, wherein the first region is smaller than the first reference region by the first amount that is determined dependent on the density adjustment value, with an input value at the first inflection point being greater than an input value at the first reference inflection point by the first amount; and wherein the second region is greater than the second reference region by the second amount that is determined dependent on the density adjustment value, with an input value at the second inflection point being greater than an input value at the second reference inflection point by the second amount.

12. A density-adjusting device according to claim 2, wherein the amount of the first region in the set of non-reference gamma characteristics is different from the amount of the first reference region by a first amount that is determined dependent on the density adjustment value;

wherein the amount of the second region in the set of non-reference gamma characteristics is different from the amount of the second reference region by a second amount that is determined dependent on the density adjustment value;

wherein the first inflection point in the set of non-reference gamma characteristics is shifted from the first reference inflection point by the first amount and in a first direction that are determined dependent on the density adjustment value;

wherein the second inflection point in the set of non-reference gamma characteristics is shifted from the second reference inflection point by the second amount and in a second direction that are determined dependent on the density adjustment value;

wherein the additional inflection point in the set of non-reference gamma characteristics is the same as a point that is located on the reference monotonous curve as being shifted from the first reference inflection point along the reference monotonous curve by a third amount that is determined dependent on the density adjustment value and as being shifted from the second reference inflection point along the reference monotonous curve by a fourth amount that is determined dependent on the density adjustment value; and wherein the monotonous curve in the set of non-reference gamma characteristics includes:

a first monotonous curve that extends between the additional inflection point and the first inflection point and that is different from a section of the reference monotonous curve between the point the same as the additional inflection point and the first reference inflection point; and a second monotonous curve that extends between the additional inflection point and the second inflection point and that is different from a section of the reference monotonous curve between the point the same as the additional inflection point and the second reference inflection point.

13. A density-adjusting device according to claim 12, wherein the first region is greater than the first reference region by the first amount that is determined dependent on the density adjustment value, with an input value at the first inflection point being smaller than an input value at the first reference inflection point by the first amount; and wherein the second region is smaller than the second reference region by the second amount that is determined dependent on the density adjustment value, with an input value at the second inflection point being smaller than an input value at the second reference inflection point by the second amount.

14. A density-adjusting device according to claim 12, wherein the first region is smaller than the first reference region by the first amount that is determined dependent on the density adjustment value, with an input value at the first inflection point being greater than an input value at the first reference inflection point by the first amount; and wherein the second region is greater than the second reference region by the second amount that is determined dependent on the density adjustment value, with an input value at the second inflection point being greater than an input value at the second reference inflection point by the second amount.

15. A density-adjusting device according to claim 2, wherein the plurality of sets of non-reference gamma characteristics includes:

a set of lightened non-reference gamma characteristics for a lightened density adjustment value, according to which a density of image data is desired to be lightened relative to the predetermined reference density value; and a set of darkened non-reference gamma characteristics for a darkened density adjustment value, according to which a density of image data is desired to be darkened relative to the predetermined reference density value, wherein the first region in the set of lightened non-reference gamma characteristics is greater than the first reference region by a first amount that is determined dependent on the lightened density adjustment value;

wherein the second region in the set of lightened non-reference gamma characteristics is the same as the second reference region; wherein an input value at the first inflection point in the set of lightened non-reference gamma characteristics is smaller than an input value at the first reference inflection point by the first amount that is determined dependent on the lightened density adjustment value;

wherein the second inflection point in the set of lightened non-reference gamma characteristics is the same as the second reference inflection point;

wherein the additional inflection point in the set of lightened non-reference gamma characteristics is the same as a point that is located on the reference monotonous curve as being shifted from the first reference inflection point along the reference monotonous curve by a first shift amount that is determined dependent on the lightened density adjustment value;

wherein the monotonous curve in the set of lightened non-reference gamma characteristics extends between the additional injection point and the first inflection point and is different from a section of the reference monotonous curve between the point the same as the additional inflection point and the first reference inflection point; and wherein the set of lightened non-reference gamma characteristics farther has an additional monotonous curve that extends between the additional inflection point and the second inflection point and that is the same as a section of the reference monotonous curve between the point the same as the additional inflection point and the second reference inflection point, wherein the first region in the set of darkened non-reference gamma characteristics is the same as the first reference region;

wherein the second region in the set of darkened non-reference gamma characteristics is greater than the second reference region by a second amount that is determined dependent on the darkened density adjustment value;

wherein the first inflection point in the set of darkened non-reference gamma characteristics is the same as the first reference inflection point;

wherein an input value at the second inflection point in the set of darkened non-reference gamma characteristics is greater than an input value at the second reference inflection point by the second amount that is determined dependent on the darkened density adjustment value;

wherein the additional inflection point in the set of darkened non-reference gamma characteristics is the same as a point that is located on the reference monotonous curve as being shifted from the second reference inflection point along the reference monotonous curve by a second shift amount that is determined dependent on the darkened density adjustment value;

wherein the monotonous curve in the set of darkened non-reference gamma characteristics extends between the additional inflection point and the second inflection point and is different from a section of tie reference monotonous curve between the point the same as the additional inflection point and the second reference inflection point; and wherein the set of darkened non-reference gamma characteristics further has an additional monotonous curve that extends between the additional inflection point and the first inflection point and that is the same as a section of the reference monotonous curve between the point the same as the additional inflection point and the first reference inflection point.

16. A density-adjusting device according to claim 2, wherein the plurality of sets of non-reference gamma characteristics includes:
   a set of lightened non-reference gamma characteristics for a lightened density adjustment value, according to which a density of image data is desired to be lightened relative to the predetermined reference density value; and
   a set of darkened non-reference gamma characteristics for a darkened density adjustment value, according to which a density of image data is desired to be darkened relative to the predetermined reference density value, wherein the first region in the set of darkened non-reference gamma characteristics is smaller than the first reference region by a first amount that is determined dependent on the darkened density adjustment value;
   wherein the second region in the set of darkened non-reference gamma characteristics is the same as the second reference region; wherein an input value at the first inflection point in the set of darkened non-reference gamma characteristics is greater than an input value at the first reference inflection point by the first amount that is determined dependent on the darkened density adjustment value;
   wherein the second inflection point in the set of darkened non-reference gamma characteristics is the same as the second reference inflection point;
   wherein the additional inflection point in the set of darkened non-reference gamma characteristics is the same as a point that is located on the reference monotonous curve as being shifted from the first reference inflection point along the reference monotonous curve by a first shift amount that is determined dependent on the darkened density adjustment value;
   wherein the monotonous curve in the set of darkened non-reference gamma characteristics extends between the additional inflection point and the first inflection point and is different from a section of the reference monotonous curve between the point the same as the additional inflection point and the first reference inflection point; and
   wherein the set of darkened non-reference gamma characteristics further has an additional monotonous curve that extends between the additional inflection point and the second inflection point and that is the same as a section of the reference monotonous curve between the point the same as the additional inflection point and the second reference inflection point, wherein the first region in the set of lightened non-reference gamma characteristics is the same as the first reference region; wherein the second region in the set of lightened non-reference gamma characteristics is smaller than the second reference region by a second amount that is determined dependent on the lightened density adjustment value;
   wherein the first inflection point in the set of lightened non-reference gamma characteristics is the same as the first reference inflection point; wherein an input value at the second inflection point in the set of lightened non-reference gamma characteristics is smaller than an input value at the second reference inflection point by the second amount that is determined dependent on the lightened density adjustment value;
   wherein the additional inflection point in the set of lightened non-reference gamma characteristics is the same as a point that is located on the reference monotonous curve as being shifted from the second reference inflection point along the reference monotonous curve by a second shift amount that is determined dependent on the lightened density adjustment value;
   wherein the monotonous curve in the set of lightened non-reference gamma characteristics extends between the additional inflection point and the second inflection point and is different from a section of the reference monotonous curve between the point the same as the additional inflection point and the second reference inflection point; and
   wherein the set of lightened non-reference gamma characteristics further has an additional monotonous curve that extends between the additional inflection point and the first inflection point and that is the same as a section of the reference monotonous curve between the point the same as the additional inflection point and the first reference inflection point.

17. A density-adjusting device according to claim 2, wherein the plurality of sets of non-reference gamma characteristics includes:
   a set of lightened non-reference gamma characteristics for a lightened density adjustment value, according to which a density of image data is desired to be lightened relative to the predetermined reference density value; and
   a set of darkened non-reference gamma characteristics for a darkened density adjustment value, according to which a density of image data is desired to be darkened relative to the predetermined reference density value, wherein the first region in the set of lightened non-reference gamma characteristics is greater than the first reference region by a first amount that is determined dependent on the lightened density adjustment value;
   wherein the second region in the set of lightened non-reference gamma characteristics is smaller than the second reference region by a second amount that is determined dependent or the lightened density adjustment value; wherein an input value at the first inflection point in the set of lightened non-reference gamma characteristics is smaller than the first reference inflection point by the first amount that is determined dependent on the lightened density adjustment value;
   wherein an input value at the second inflection point in the set of lightened non-reference gamma characteristics is smaller than an input value at the second reference inflection point by the second amount that is determined dependent on the lightened density adjustment value;
   wherein the additional inflection point in the set of lightened non-reference gamma characteristics includes:
     a first additional inflection point that is the same as a point that is located on the reference monotonous curve as being shifted from the first reference inflection point along the reference monotonous curve by a first shift amount that is determined dependent on the lightened density adjustment value; and
     a second additional inflection point that is the same as a point that is located on the reference monotonous curve as being shifted from the second reference inflection point along the reference monotonous curve by a second shift amount that is determined dependent on the lightened density adjustment value;
   wherein the monotonous curve in the set of lightened non-reference gamma characteristics includes:

a first monotonous curve that extends between the first additional inflection point and the first inflection point and that is different from a section of the reference monotonous curve between the point the same as the first additional inflection point and the first reference inflection point; and a second monotonous curve that extends between the second additional inflection point and the second inflection point and that is different from a section of tie reference monotonous curve between the point the same as the second additional inflection point and the second reference inflection point; and wherein the set of lightened non-reference gamma characteristics farther has an additional monotonous curve that extends between the first additional inflection point and the second additional inflection point and that is the same as a section of the reference monotonous curve between the point the same as the first additional inflection point and the point the same as the second additional inflection point, wherein the first region in the set of darkened non-reference gamma characteristics is smaller than the first reference region by a third amount that is determined dependent on the darkened density adjustment value;

wherein the second region in the set of darkened non-reference gamma characteristics is larger than the second reference region by a fourth amount that is determined dependent on the darkened density adjustment value;

wherein an input value at the first inflection point in the set of darkened non-reference gamma characteristics is greater than an input value at the first reference inflection point by the third amount that is determined dependent on the darkened density adjustment value;

wherein an input value at the second inflection point in the set of darkened non-reference gamma characteristics is greater than an input value at the second reference inflection point by the fourth amount that is determined dependent on the darkened density adjustment value;

wherein the additional inflection point in the set of darkened non-reference gamma characteristics includes:
　　a first additional inflection point that is the same as a point that is located on the reference monotonous curve as being shifted from the first reference inflection point along the reference monotonous curve by a third shift amount that is determined dependent on the darkened density adjustment value; and
　　a second additional inflection point that is the same as a point that is located on the reference monotonous curve as being shifted from the second reference inflection point along the reference monotonous curve by a fourth shift amount that is determined dependent on the darkened density adjustment value:

wherein the monotonous curve in the set of darkened non-reference gamma characteristics includes:
　　a first monotonous curve that extends between the first additional inflection point and the first inflection point and that is different from a section of the reference monotonous curve between the point the same as the first additional inflection point and the first reference inflection point; and
　　a second monotonous curve that extends between the second additional inflection point and the second inflection point and that is different from a section of the reference monotonous curve between the point the same as the second additional inflection point and the second reference inflection point; and wherein the set of darkened non-reference gamma characteristics further has an additional monotonous curve that extends between the first additional inflection point and the second additional inflection point and that is the same as a section of the reference monotonous curve between the point the same as the first additional inflection point and the point the same as the second additional inflection point.

18. A density-adjusting device according to claim 2, wherein the plurality of sets of non-reference gamma characteristics includes:
　　a set of lightened non-reference gamma characteristics for a lightened density adjustment value, according to which a density of image data is desired to be lightened relative to the predetermined reference density value; and
　　a set of darkened non-reference gamma characteristics for a darkened density adjustment value, according to which a density of image data is desired to be darkened relative to the predetermined reference density value; wherein the first region in the set of lightened non-reference gamma characteristics is greater than the first reference region by a first amount that is determined dependent on the lightened density adjustment value;

wherein the second region in the set of lightened non-reference gamma characteristics is smaller than the second reference region by a second amount that is determined dependent on the lightened density adjustment value;

wherein an input value at the first inflection point in the set of lightened non-reference gamma characteristics is smaller than the first reference inflection point by the first amount that is determined dependent on the lightened density adjustment value;

wherein an input value at the second inflection point in the set of lightened non-reference gamma characteristics is smaller than an input value at the second reference inflection point by the second amount that is determined dependent on the lightened density adjustment value;

wherein the additional inflection point in the set of lightened non-reference gamma characteristics is the same as a point that is located on the reference monotonous curve as being shifted from the first reference inflection point along the reference monotonous curve by a first shift amount that is determined dependent on the lightened density adjustment value and as being shifted from the second reference inflection point along the reference monotonous curve by a second shift amount that is determined dependent on the lightened density adjustment value;

wherein the monotonous curve in the set of lightened non-reference gamma characteristics includes: a first monotonous curve that extends between the additional inflection point and the first inflection point and that is different from a section of the reference monotonous curve between the point the same as the additional inflection point and the first reference inflection point; and a second monotonous carve that extends between the additional inflection point and the second inflection point and that is different from a section of the reference monotonous curve between the point the same as the additional inflection point and the second reference inflection point, wherein the first region in the set of darkened non-reference gamma characteristics is smaller than the first reference region by a third amount that is determined dependent on the darkened density adjustment value;

wherein the second region in the set of darkened non-reference gamma characteristics is larger than the second reference region by a fourth amount that is determined dependent on the darkened density adjustment value;

wherein an input value at the first inflection point in the set of darkened non-reference gamma characteristics is greater than an input value at the first reference inflection point by the third amount that is determined dependent on the darkened density adjustment value;

wherein an input value at the second inflection point in the set of darkened non-reference gamma characteristics is greater than an input value at the second reference inflection point by the fourth amount that is determined dependent on the darkened density adjustment value;

wherein the additional inflection point is the same as a point that is located on the reference monotonous curve as being shifted from the first reference inflection point along the reference monotonous curve by a third shift amount that is determined dependent on the darkened density adjustment value and as being shifted from the second reference inflection point along the reference monotonous curve by a fourth shift amount that is determined dependent on the darkened density adjustment value;

wherein the monotonous curve in the set of darkened non-reference gamma characteristics includes:
a first monotonous curve that extends between the additional inflection point and the first inflection point and that is different from a section of the reference monotonous curve between the point the same as the additional inflection point and the first reference inflection point; and
a second monotonous curve that extends between the additional inflection point and the second inflection point and that is different from a section of the reference monotonous curve between the point the same as the additional inflection point and the second reference inflection point.

19. A density-adjusting device according to claim 1, wherein the density-adjustment-value setting unit is further configured to set a non-adjustment indication not to adjust the density of image data from the reference density, and wherein the correcting unit corrects the values of the image data by using the set of reference gamma characteristics when the density-adjustment-value setting unit sets the non-adjustment indication.

20. A density-adjusting device according to claim 19, further comprising a selecting unit that selects one set of gamma characteristics among the set of reference gamma characteristics and the plurality of sets of non-reference gamma characteristics, the selecting unit selecting the set of reference gamma characteristics when the density-adjustment-value setting unit sets the non-adjustment indication, the selecting unit selecting, when the density-adjustment-value setting unit sets the desired density adjustment value, one set of non-reference gamma characteristics that corresponds to the desired density adjustment value, and wherein the correcting unit corrects the values of the image data by using the selected one set of gamma characteristics.

21. A density-adjusting device according to claim 20, further comprising an image reading unit that reads an original to produce the image data, the correcting unit correcting the values of the image data.

22. A density-adjusting device according to claim 21, further comprising an image recording unit that records a copied image of the original by using the image data corrected by the correcting unit.

23. A density-adjusting device according to claim 22, further comprising a copy mode setting unit that sets a copy mode among a plurality of copy modes, wherein the gamma characteristics storing unit is pre-stored with the set of reference gamma characteristics and is pre-stored with the plurality of sets of non-reference gamma characteristics in correspondence with a plurality of combinations of the plurality of density adjustment values and a plurality of copy modes, wherein the selecting unit selects the set of reference gamma characteristics when the density-adjustment-value setting unit sets the non-adjustment indication, and selects, when the density-adjustment-value setting unit sets the desired density adjustment value, one set of non-reference gamma characteristics that corresponds to a combination of the desired density adjustment value and the set copy mode.

24. A density-adjusting device according to claim 22, further comprising a copy mode setting unit that sets a copy mode among a plurality of copy modes, wherein the gamma characteristics storing unit is pre-stored with a plurality of sets of reference gamma characteristics in correspondence with the plurality of copy modes and is pre-stored with the plurality of sets of non-reference gamma characteristics in correspondence with a plurality of combinations of the plurality of density adjustment values and a plurality of copy modes, wherein the selecting unit selects one set of reference gamma characteristics that corresponds to the set copy node when the density-adjustment-value setting unit sets the non-adjustment indication, and selects, when the density-adjustment-value setting unit sets the desired density adjustment value, one set of non-reference gamma characteristics that corresponds to a combination of the desired density adjustment value and the set copy mode.

* * * * *

UNITED STATES PATENT AND TRADEMARK OFFICE
CERTIFICATE OF CORRECTION

| | | |
|---|---|---|
| PATENT NO. | : 7,580,168 B2 | Page 1 of 1 |
| APPLICATION NO. | : 11/143733 | |
| DATED | : August 25, 2009 | |
| INVENTOR(S) | : Takahiro Ikeno | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1094 days.

Signed and Sealed this

Fourteenth Day of September, 2010

David J. Kappos
*Director of the United States Patent and Trademark Office*